US008656357B2

(12) United States Patent
Aoyama et al.

(10) Patent No.: US 8,656,357 B2
(45) Date of Patent: *Feb. 18, 2014

(54) TESTING INTERNATIONALIZED SOFTWARE USING TEST RESOURCE FILE AND TEST FONT

(75) Inventors: Nozomu Aoyama, Yokohama (JP); Toshimichi Arima, Fujisawa (JP); Takaharu Itoh, Yokohama (JP); Yuko Ito, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 1646 days.

This patent is subject to a terminal disclaimer.

(21) Appl. No.: 11/853,412

(22) Filed: Sep. 11, 2007

(65) Prior Publication Data

US 2008/0066058 A1  Mar. 13, 2008

(30) Foreign Application Priority Data

Sep. 11, 2006  (JP) .................................. 2006-246177

(51) Int. Cl.
*G06F 9/44* (2006.01)

(52) U.S. Cl.
USPC .......................................... 717/125; 717/124

(58) Field of Classification Search
USPC ............. 717/124–136; 714/37, 38.1; 715/269
See application file for complete search history.

(56) References Cited

U.S. PATENT DOCUMENTS

| 4,864,503 A | 9/1989 | Tolin |
| 5,263,162 A | 11/1993 | Lundeby |
| 5,438,628 A * | 8/1995 | Spitz et al. .................. 382/181 |
| 5,732,276 A | 3/1998 | Komatsu et al. |
| 5,800,073 A | 9/1998 | Matsuda et al. |
| 6,158,045 A | 12/2000 | You |
| 6,185,729 B1 * | 2/2001 | Watanabe et al. ............. 717/100 |
| 6,425,123 B1 | 7/2002 | Rojas et al. |
| 6,453,462 B1 | 9/2002 | Meade et al. |
| 6,507,812 B1 | 1/2003 | Meade et al. |
| 6,745,348 B2 * | 6/2004 | Chung et al. ................. 714/47.1 |
| 6,813,747 B1 * | 11/2004 | Taieb ............................ 715/269 |
| 6,931,628 B2 * | 8/2005 | McGeorge, Jr. .............. 717/124 |
| 7,503,036 B2 * | 3/2009 | Schultz ........................ 717/124 |
| 7,752,501 B2 * | 7/2010 | Bak ............................. 714/38.14 |
| 7,895,576 B2 * | 2/2011 | Chang et al. ................. 717/124 |
| 8,286,136 B2 | 10/2012 | Aoyama et al. |
| 2001/0013116 A1 * | 8/2001 | Watanabe et al. ................. 717/1 |
| 2003/0005364 A1 * | 1/2003 | Chung et al. ..................... 714/38 |
| 2003/0065985 A1 * | 4/2003 | McGeorge, Jr. ................ 714/46 |
| 2003/0212982 A1 * | 11/2003 | Brooks et al. ................. 717/100 |

(Continued)

OTHER PUBLICATIONS

Nakayama, Takehiro, "Modeling Content Identification from Document Images," Oct. 1994, Association for Computational Linguistics, p. 22-27.*

(Continued)

Primary Examiner — Qing Chen
(74) Attorney, Agent, or Firm — Jeffrey T. Holman

(57) ABSTRACT

An efficient testing method is provided for internationalized software executed in a plurality of language environments. The method includes mock-translating an externalized resource file written in a first language of the internationalized software by converting characters of the first language to characters of a second language based on a conversion table; and displaying output information from the internationalized software that performs processing by referring to the mock-translated test resource file using one of a plurality of fonts prepared for respective test categories.

20 Claims, 13 Drawing Sheets

(56) References Cited

U.S. PATENT DOCUMENTS

| | | |
|---|---|---|
| 2005/0010392 A1 | 1/2005 | Chen et al. |
| 2005/0091576 A1 | 4/2005 | Relyea et al. |
| 2005/0188308 A1* | 8/2005 | Schultz .................. 715/534 |
| 2006/0136907 A1 | 6/2006 | Bennett et al. |
| 2008/0066058 A1 | 3/2008 | Aoyama et al. |
| 2008/0115111 A1* | 5/2008 | Chang et al. .................. 717/126 |
| 2008/0127103 A1* | 5/2008 | Bak .............................. 717/126 |

OTHER PUBLICATIONS

Kehn, Dan, "How to Test Your Internationalized Eclipse Plug-In," Aug. 2002, IBM Corp.*

Kato et al., "String Resource ID for Translation Verification Test," Jul. 2004, IPSJ SIG Technical Reports, p. 95-102.*

\* cited by examiner

FIG. 1A
ORIGINAL RESOURCE FILE
MSG01=The status is {0}.
Color01=Green
Color02=Red
Color03=Yellow
MSG02=Refresh the Status
MSG03=Sort
FIG. 1B
SOURCE CODE
...
showMessage(MSG01,new Object("Green"))
...
FIG. 1C
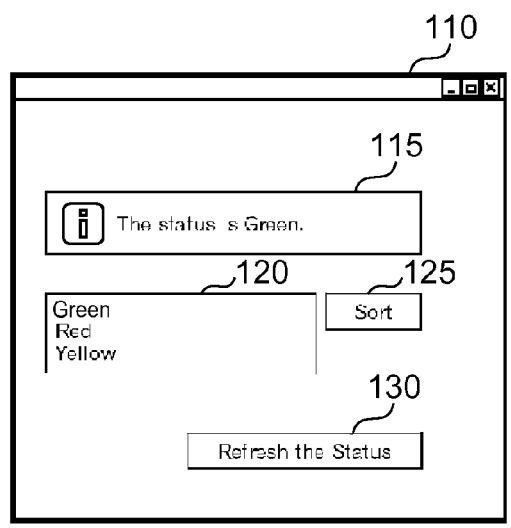
FIG. 2A
MOCK-TRANSLATED RESOURCE FILE
MSG01=[竹(T)金he status 開始 {0}終了.----]
Color01=[講(G)愛reen----]
Color02=[ソ(R)+ed----]
Color03=[(株)(Y)鰻ellow----]
MSG02=[ソ(R)+efresh the Status.----]
MSG03=[豹(S)兎ort.----]
FIG. 2B
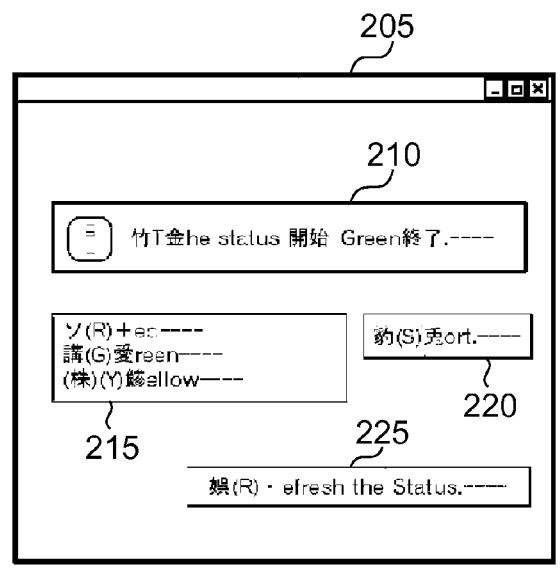

FIG. 4A

```
                                                   400
ORIGINAL RESOURCE FILE

MSG01=The status is {0}.
Color01=Green
Color02=Red
Color03=Yellow
MSG02=Refresh the Status
MSG03=Sort
```

| CHARACTER CODE | CHARACTER | CHARACTER CODE | CHARACTER |
|---|---|---|---|
| U+0020 | BLANK CHARACTER | U+3000 | DOUBLE-WIDTH BLANK |
| ... | ... | ... | ... |
| U+0053 | S | U+8868 | 表 |
| U+0054 | T | U+5642 | 噂 |
| U+0055 | U | U+30BD | ソ |
| ... | ... | ... | ... |
| U+007E | ～ | U+FFEA | ↑ |

FIG. 4C

```
                                                   410
TEST RESOURCE FILE

MSG01=噂愛鮭 力せあせ弓力 金力 {0}.
Color01=ひど鮭鮭￥
Color02=☆鮭エ
Color03=～鮭構構No.留
MSG02=☆鮭悔ど鮭力愛 せ愛鮭 力せあせ弓力
MSG03=表No.どせ
```

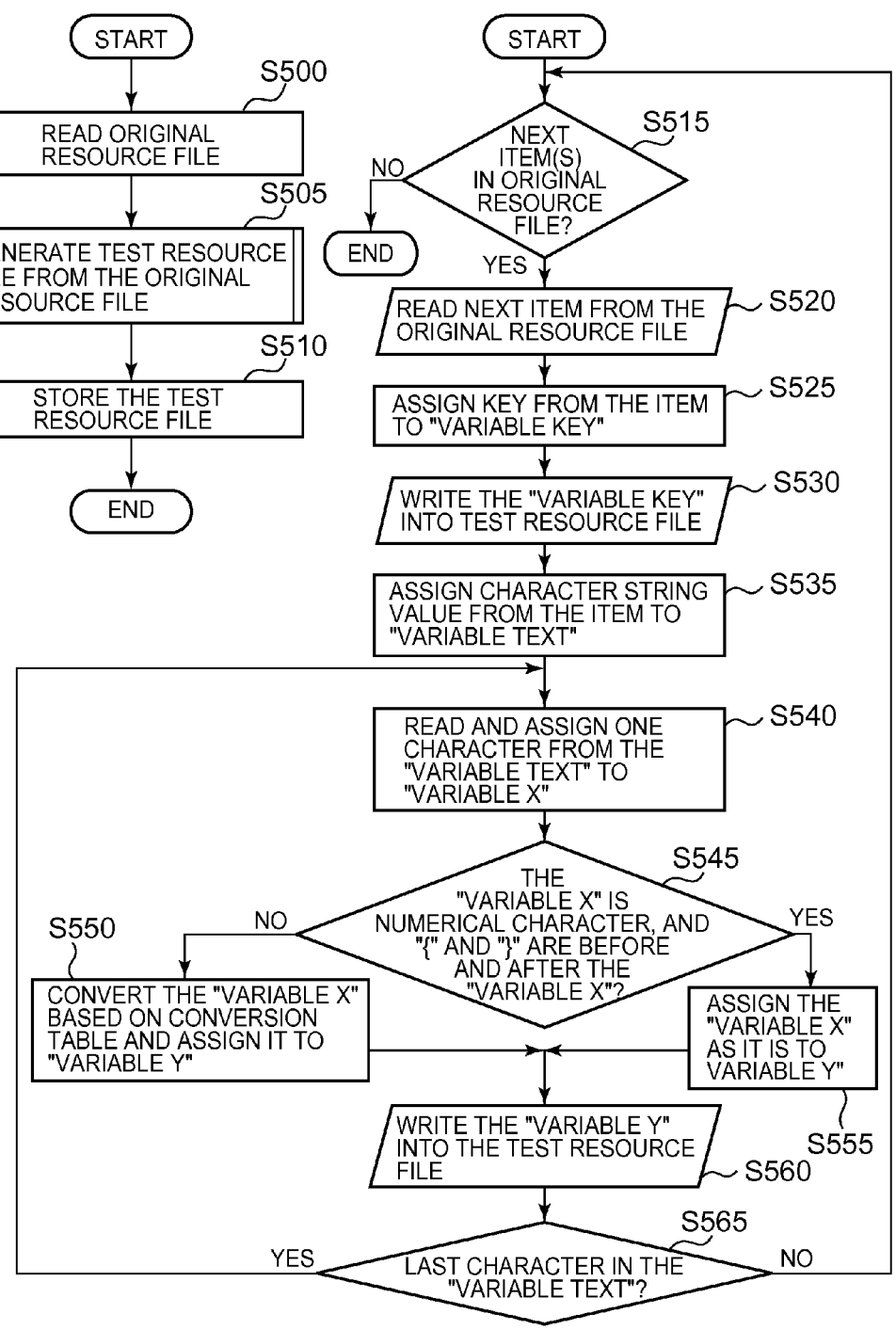

FIG. 7A

HARD-CODED CHARACTER DETECTION FONT

| CHARACTER CODE | GLYPH IN REGULAR FONT | GLYPH IN HARD-CODED CHARACTER DETECTION FONT | |
|---|---|---|---|
| U+3000 | BLANK | □ | ⎫ CHARACTER CODES THAT ARE NOT THE TEST OBJECTS (CHARACTER CODES CORRESPONDING TO THE CHARACTERS OF THE TRANSLATION TARGET LANGUAGE INCLUDED IN THE CONVERSION TABLE) |
| ... | ... | ... | |
| U+FFEA | ↑ | □ | |
| U+0020 | BLANK CHARACTER | BLANK CHARACTER | ⎫ CHARACTER CODES AS THE TEST OBJECTS (CHARACTER CODES CORRESPONDING TO THE CHARACTERS OF THE ORIGINAL LANGUAGE) |
| ... | ... | ... | |
| U+0053 | S | S | |
| ... | ... | ... | |
| U+007E | ~ | ~ | |
| OTHER CHARACTER CODES | □ | □ | ⎫ CHARACTER CODES THAT ARE NOT THE TEST OBJECTS (CHARACTER CODES NOT CORRESPONDING TO EITHER THE CHARACTERS OF THE ORIGINAL LANGUAGE OR THE CHARACTERS OF THE TRANSLATION TARGET LANGUAGE INCLUDED IN THE CONVERSION TABLE) |

Table 700

FIG. 7B

SCREEN DISPLAY USING HARD-CODED CHARACTER DETECTION FONT 705

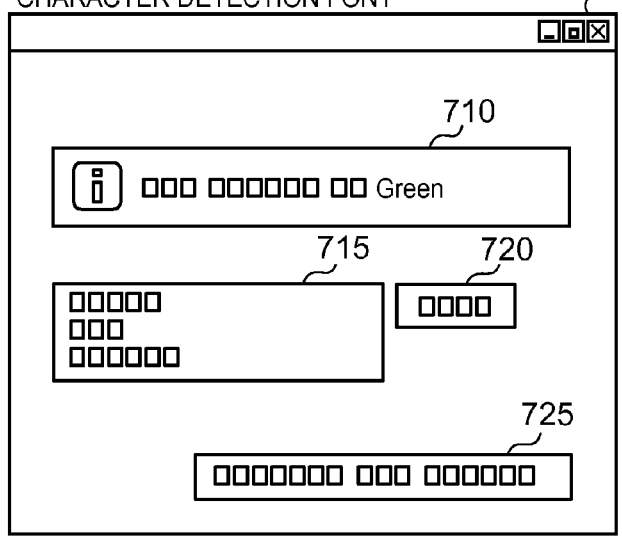

FIG. 8A

GARBLED CHARACTER DETECTION FONT 800

| CHARACTER CODE (JAPANESE) | GLYPH IN REGULAR FONT | GLYPH IN GARBLED CHARACTER DETECTION FONT |
|---|---|---|
| U+3000 | DOUBLE-WIDTH BLANK | □ |
| ... | ... | ... |
| U+FFEA | ↑ | □ |
| U+0020 | BLANK CHARACTER | □ |
| ... | ... | ... |
| U+007E | ~ | □ |
| OTHER CHARACTER CODES | □ | ㅜ |

- (CHARACTER CODES CORRESPONDING TO THE CHARACTERS OF THE TRANSLATION TARGET LANGUAGE INCLUDED IN THE CONVERSION TABLE)
- (CHARACTER CODES CORRESPONDING TO THE CHARACTERS OF THE ORIGINAL LANGUAGE)

CHARACTER CODES THAT ARE NOT THE TEST OBJECTS

CHARACTER CODES AS THE TEST OBJECTS
(CHARACTER CODES NOT CORRESPONDING TO EITHER THE CHARACTERS OF THE ORIGINAL LANGUAGE OR THE CHARACTERS OF THE TRANSLATION TARGET LANGUAGE INCLUDED IN THE CONVERSION TABLE)

FIG. 8B

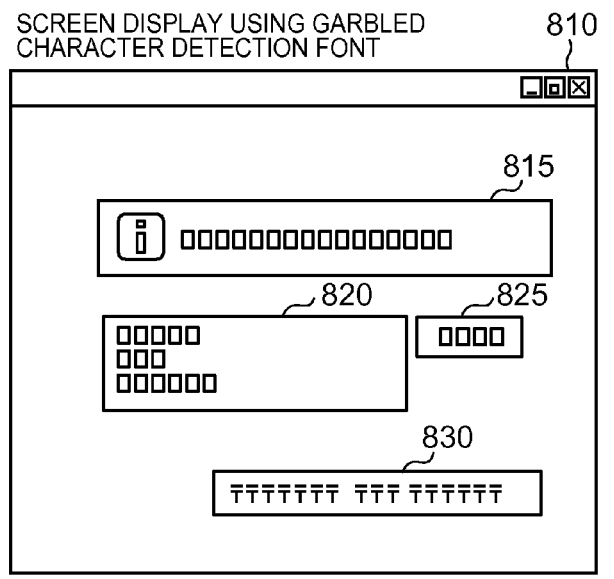

FIG. 9A

REVERSE FONT — 850

| CHARACTER CODE (ENGLISH) | CORRESPONDING CHARACTER | CHARACTER CODE (JAPANESE) | GLYPH IN REGULAR FONT | GLYPH IN REVERSE FONT | |
|---|---|---|---|---|---|
| U+0020 | BLANK CHARACTER | U+3000 | DOUBLE-WIDTH BLANK | BLANK CHARACTER | ⎫ (CHARACTER CODES CORRESPONDING TO THE CHARACTERS OF THE TRANSLATION TARGET LANGUAGE INCLUDED IN THE CONVERSION TABLE) |
| ... | ... | ... | ... | ... | |
| U+0053 | S | U+8868 | 表 | S | |
| U+0054 | T | U+5642 | 噂 | T | |
| ... | ... | ... | ... | ... | |
| ... | ... | ... | ... | ... | |
| U+007E |  | U+FFEA | ↑ | ~ | |
| N/A | N/A | U+0020 | BLANK CHARACTER | BLANK CHARACTER | ⎫ (CHARACTER CODES CORRESPONDING TO THE CHARACTERS OF THE ORIGINAL LANGUAGE) |
| N/A | N/A | ... | ... | ... | |
| N/A | N/A | U+007E | ~ | ~ | |
| N/A | N/A | OTHER CODES | □ | □/T | CHARACTER CODES THAT ARE NOT THE TEST OBJECTS (CHARACTER CODES NOT CORRESPONDING TO EITHER THE CHARACTERS OF THE ORIGINAL LANGUAGE OR THE CHARACTERS OF THE TRANSLATION TARGET LANGUAGE INCLUDED IN THE CONVERSION TABLE) |

855 indicates row U+0053.
Rows above U+FFEA are CHARACTER CODES AS THE TEST OBJECTS.

FIG. 9B

SCREEN DISPLAY USING REVERSE FONT

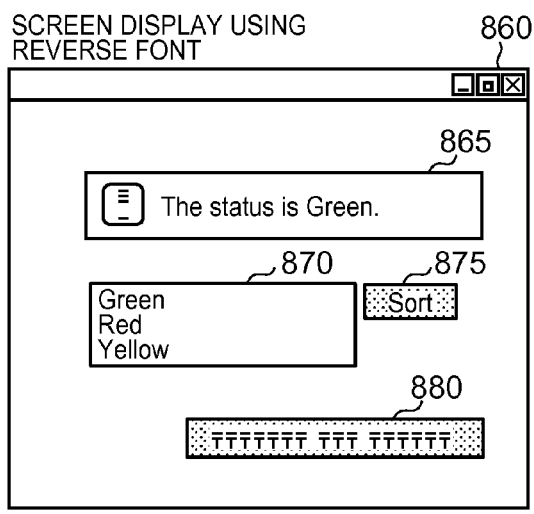

FIG. 10A

SORT FONT

| CHARACTER CODE | GLYPH IN REGULAR FONT | GLYPH IN HARD-CODED CHARACTER DETECTION FONT | |
|---|---|---|---|
| U+3000 | DOUBLE-WIDTH BLANK | (15) / □ | ⎫ CHARACTER CODES AS THE TEST OBJECTS (CHARACTER CODES CORRESPONDING TO THE CHARACTERS OF THE TRANSLATION TARGET LANGUAGE INCLUDED IN THE CONVERSION TABLE) |
| ... | ... | ... | |
| U+308C | れ | (19) | |
| ... | ... | ... | |
| U+8868 | 表 | (38) | |
| ... | ... | ... | |
| U+FFEA | ↑ | (93) / □ | ⎭ |
| U+0020 | BLANK CHARACTER | □ | (CHARACTER CODES CORRESPONDING TO THE CHARACTERS OF THE ORIGINAL LANGUAGE) ⎫ CHARACTER CODES THAT ARE NOT THE TEST OBJECTS |
| ... | ... | ... | |
| U+007E | ～ | □ | |
| OTHER CHARACTER CODES | □ | □ | (CHARACTER CODES NOT CORRESPONDING TO EITHER THE CHARACTERS OF THE ORIGINAL LANGUAGE OR THE CHARACTERS OF THE TRANSLATION TARGET LANGUAGE INCLUDED IN THE CONVERSION TABLE) ⎭ |

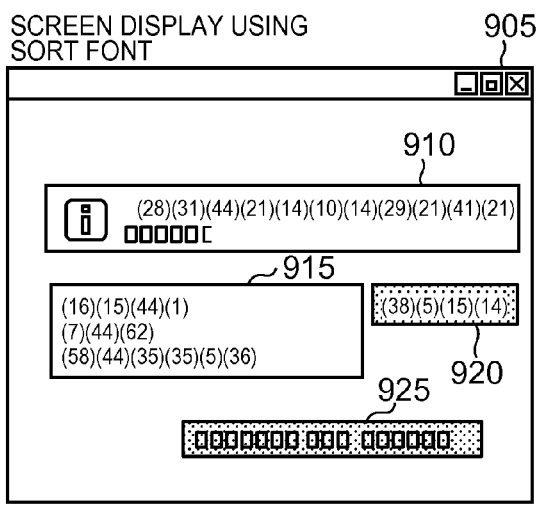

SCREEN DISPLAY USING SORT FONT 905

910: (28)(31)(44)(21)(14)(10)(14)(29)(21)(41)(21) □□□□□□

915: (16)(15)(44)(1) (7)(44)(62) (58)(44)(35)(35)(5)(36)

920: (38)(5)(15)(14)

925

TESTING INTERNATIONALIZED SOFTWARE USING TEST RESOURCE FILE AND TEST FONT

CROSS-REFERENCE TO RELATED APPLICATIONS

This application claims the benefit of foreign priority of Japanese Patent Application No. 2006-246177, which was filed on Sep. 11, 2006. This application is also related to U.S. Pat. No. 7,581,208, issued on Aug. 25, 2009, and U.S. Pat. No. 8,286,136, issued on Oct. 9, 2012.

FIELD OF THE INVENTION

The present invention relates to a technology for testing internationalized software executed in a plurality of language environments. More particularly, the present invention relates to a technology concerning a test of an output to a user from the internationalized software executed in a language environment different from that of an original language, which is capable of improving visibility of test objects to enable efficient testing.

BACKGROUND OF THE INVENTION

Software supporting a plurality of languages is called "internationalized software". In the internationalized software, a text string part to be displayed on a screen is separated from the source code, and the text string part thus separated is stored as an externalized resource file. The externalized resource file is referred to upon execution of the internationalized software, and used by the internationalized software to make a screen display. When such a configuration is employed, it is only necessary for a developer of the internationalized software to translate the externalized resource file to another language to make the internationalized software support the other language. Moreover, once the externalized resource file is translated, it is unnecessary to redo the translation even if the execution code is changed.

In a development process of such internationalized software, tests are conducted for various characteristics or aspects (hereinafter, referred to as "test categories") to see whether the internationalized software operates properly in language environments of different countries. Among them, the tests concerning an output to the user include one that checks whether a message or other character string to be displayed to the user has been separated from the source code and externalized property as a resource file. In other words, this is a hard-coded character string detection test that confirms that the message or other character string to be displayed to the user is not directly described (i.e., hard-coded) in the source code. There also is a validation test of a sort result that checks whether a list of character strings is sorted properly in the order defined in each language, such as alphabetic order. Also conducted is a displayability test of language-specific characters that checks whether characters specific to each language are displayed properly without being garbled, for example.

Translation of the externalized resource file takes time. Thus, in the development process, it is not feasible to use a translated, externalized resource file for testing each problem category described above in each desired language. For this reason, there was conventionally developed a method for mock-translating an externalized resource file to use it as the externalized resource file that approximates certain attributes, such as character length, of a target language. In this conventional technology, the mock translation includes placeholder data, e.g., characters, that expands the spacing allocated to the text to accommodate for the spacing required for translations. In a preferred embodiment, all English text that would appear on the graphical user interface (i.e., buttons, menus, pop-up dialogs, dialog window titles, dialog text, error messages, help windows, etc.) is expanded using tildes, and is enclosed with brackets, i.e., [ ]. This mock translation data is stored in localization files and displayed in a software application in place of the English or foreign-language text. The GUI is then tested by visually inspecting each screen. The programmer or proofreader is able to easily recognize many errors that would occur if the GUI were to be displayed in a translated language, without requiring the ability to read any foreign languages. These errors, referred to as internationalization errors, include truncation, expansion, alignment, or other formatting errors, and programming errors such as text that is hard-coded, text missing from localization files, localization files missing from the program build, and text composed of more than one translated message (see U.S. Pat. No. 6,507,812 and U.S. Pat. No. 6,453,462). There also is a technology in which narrow or single-width alphabetic characters of the original language are all replaced with wide or double-width alphabetic characters to create a mock translation (see U.S. Pat. No. 6,425,123). In these technologies, it is confirmed that on a screen display of the output of the internationalized software that performs processing by referring to the mock-translated resource file, the added characters or the double-width alphabetic characters are displayed properly for each of the character strings of the original language. If only a character string of the original language is displayed, it is a hard-coded character string. Further, if any of the added characters or the double-width alphabetic characters is replaced with another character, it is a garbled character.

SUMMARY OF THE INVENTION

The invention improves techniques for internationalizing software by using mock translation files. A second file of messages to be outputted by the software is created from a first file of messages. The messages in the first file are written in a first language. The creating of the second file comprises for each message in the first file, a) applying specified rules to form a second message by changing the character length of the second message, b) filling in any blank characters in the second message with a dummy character, c) inserting characters from the target language into prescribed places in the second message to form a second message having both characters of the first language and characters of the target language, and d) copying the second message into the second file, and executing the software using the second file.

In another embodiment, a second file of messages to be outputted by the software is created from the first file of messages. The messages in the first file are written in a first language. One or more test characters in a target language are selected. The creating of the second file comprises for each message in the first file, translating all characters in the first language corresponding to the test characters to the corresponding characters in the target language, and changing all other characters in the message to a dummy visible character, copying the translated message into the second file and executing the software using the second file.

In view of the foregoing, the invention improves the mock translation of the conventional art. The first improvement is that, for each string item in the resource file of the original language, different characters of the translation target language that would likely cause a problem are added before and after, or only before, the first characters of the character strings of the original language in the mock resource file. The second improvement is that marks indicating the beginning and the end of an assignment portion of a string item are added before and after the assignment portion in the mock resource file. With these improvements, on the screen display of the output of the internationalized software performing processing by referring to the mock-translated resource file, different characters of the translation target language are displayed in front of the character strings of the original language. Accordingly, it has become possible to conduct the validation test of the sort result on the display screen of the internationalized software using the improved mock translation, which was not possible with the above-described conventional technologies. Furthermore, with the improved mock translation, different characters of the translation target language of an arbitrary length can be added to different first characters of the character strings of the original language. Thus, in the improved mock translation, it has become possible to conduct the displayability test for a greater number of language-specific characters using a single resource file. Still further, on the screen display of the internationalized software using the improved mock translation, the marks indicating the beginning and the end of the assignment portion are displayed before and after the assignment portion. As a result, the assignment portion has become distinguishable, and accordingly, in the improved mock translation, it has become possible to appropriately conduct the detection of the hard-coded character string(s) for the assignment portion.

The improved testing method described above, however, still has several problems. Firstly, in the improved testing method of the conventional art, although the assignment portion may be identified, there still is a possibility that a hard-coded character string may be overlooked. Further, in the improved testing method, although it may be possible to confirm that the list of the character strings is sorted as a result of sorting, a tester who does not have any knowledge about the translation target language cannot determine whether the sort result is correct or not. Even a tester having knowledge about the translation target language will not be able to immediately determine whether the sort result is correct or not for Japanese or other language having a great number of types of characters. Furthermore, with the improved methods an increased number of types of characters of the translation target language are displayed on the screen, making it impossible for the tester to immediately determine whether there is any garbled character among the characters displayed on the screen.

Moreover, in the improved testing method, it is tried to check for all the test categories on a single display screen of the internationalized software that performs processing by referring to the mock-translated resource file; this results in poor visibility of the test objects. If different externalized resource files suitable for the respective contents of the test categories are prepared, however, it will be necessary to restart the internationalized software the number of times corresponding to the number of test categories, which hinders efficient testing.

In view of the foregoing, an object of the present invention is to provide a method, apparatus and program for efficiently testing internationalized software with improved visibility of the test objects and with no need of restarting the internationalized software, and to provide a data structure of a font used for the test. Another object of the present invention is to ensure that hard-coded character strings are detected without omission in the test of the internationalized software. A further object of the present invention is to ensure that, when a plurality of character strings are sorted, determination as to whether the sort result is proper can be made irrespective of presence/absence of knowledge about the translation target language in the test of the internationalized software. Yet another object of the present invention is to facilitate determination as to whether there is any garbled character in the test of the internationalized software.

To achieve the above-described objects, the present invention provides a method for testing internationalized software executed by a computer as follows. Herein, the internationalized software refers to software that performs processing by referring to an externalized resource file and that is executed in a plurality of language environments. The method for testing the internationalized software includes the steps of: reading data from the externalized resource file written in a first language; generating a test resource file written in a second language from the externalized resource file written in the first language by converting characters of the first language included in the data to characters of the second language by referring to a conversion table having the characters of the first language and the characters of the second language associated one for one with each other; executing the internationalized software; and displaying output information outputted from the internationalized software that performs processing by referring to the test resource file as the externalized resource file on a screen by using one of a plurality of fonts prepared for respective test categories of the internationalized software.

Herein character codes included in the output information can be classified into three groups: a first group of a plurality of character codes corresponding to the characters of the first language, which are not supposed to be included in the output information; a second group of a plurality of character codes corresponding to the characters of the second language included in the conversion table, which are supposed to be included in the output information; and a third group of a plurality of character codes not corresponding to either the characters of the first language or the characters of the second language included in the conversion table, which are not supposed to be included in the output information. Further, each of the plurality of fonts employing a prescribed coding scheme uses different association rules when associating character shapes to a group of a plurality of character codes that are test objects in a test of the internationalized software and a group of the other character codes in the prescribed character coding scheme, such that the character codes as the test objects and the other character codes are distinguishable from each other in a display of the output information using the relevant font.

Therefore, according to the present invention, the character codes as the test objects are displayed in a manner distinguishable from the other character codes, which improves visibility of the test objects. White the test objects differ for each test category, according to the present invention, a plurality of fonts are prepared for the respective test categories, so that it is possible to provide a display screen suitable for the test for each test category by only using the corresponding font, without the need to restart the internationalized software.

Preferably, the step of displaying the output information using one of the plurality of fonts includes the step of displaying the output information using one font selected by a user from the plurality of fonts. Alternatively, the above step includes the step of displaying the output information by switching the font being used to one font selected by a user from the plurality of fonts. Further, preferably, the conversion table has some of the characters of the first language associated one for one with some of the characters of the second language that would likely cause a problem in terms of display.

Further, preferably, the test categories include detection of a hard-coded character string. In the font used for the detection of the hard-coded character string, the first group corresponds to the group of a plurality of character codes that are the test objects, and the character codes of the first group are each associated with the character shape of the character of the first language corresponding to the relevant character code without modification. Preferably, the above font causes each of the other character codes in the prescribed character coding scheme to be associated with a same character shape. The same character shape is preferably a less frequently used symbol or an inconspicuous symbol such as a hollow square symbol.

Further, preferably, the test categories include validity of a sort result of character strings according to the order of characters defined in the second language. In the font used for the determination of validity of the sort result, the second group corresponds to the group of a plurality of character codes that are the test objects, and the character codes of the second group are each associated with the character shape indicating the order defined for the character of the second language corresponding to the relevant character code. Preferably, the above font causes each of the other character codes in the prescribed character coding scheme to be associated with a same character shape. The same character shape is preferably a less frequently used symbol or an inconspicuous symbol such as a hollow square symbol.

Further, preferably, the test categories include displayability of characters specific to the second language. In the font used for the determination of displayability, the third group corresponds to the group of a plurality of character codes that are the test objects, and the character codes of the third group are each associated with a same character shape. The same character shape is preferably a less frequently used symbol or a conspicuous symbol.

Further, preferably, the test categories include character string confirmation for confirming the character strings included in the externalized resource file written in the first language. In the font used for the character string confirmation, the second group corresponds to the group of a plurality of character codes that are the test objects, and the character codes of the second group are each associated with the character shape of the character of the first language that has the character of the second language corresponding to the relevant character code as a converted-to character upon generation of the test resource file. In the above test category, the first group also corresponds to the group of a plurality of character codes that are the test objects, and the character codes of the first group are each associated with the character shape of the character of the first language corresponding to the relevant character code without modification.

According to another aspect of the present invention, there is provided a data structure of a font employing a prescribed character coding scheme used in a test of internationalized software that refers to a test resource file generated by converting all the characters of a first character included in an externalized resource file written in the first language to characters of a second language one for one based on a conversion table. The data structure includes: a plurality of first character codes that are test objects in the test; a plurality of items of first character shape information associated one for one with the plurality of first character codes according to a first rule; a plurality of second character codes that are other character codes in the prescribed character coding scheme; and a plurality of items of second character shape information associated one for one with the plurality of second character codes according to a second rule.

Here, the plurality of first character codes correspond to one of a plurality of character codes corresponding to the characters of the first language a plurality of character codes corresponding to the characters of the second language included in the conversion table, and a plurality of character codes not corresponding to either the characters of the first language or the characters of the second language included in the conversion table. When the first character code is detected from an output of the internationalized software that performs processing by referring to the test resource fire, the first character shape information corresponding to the relevant first character code is retrieved from the font data and used for screen display. When the second character code is detected from the output, the second character shape information corresponding to the relevant second character code is retrieved from the font data, which is used for screen display.

While the present invention has been explained above as the method for testing the internationalized software, it is also possible to understand the present invention as an apparatus, a program, or a storage medium storing the program. Further, the features explained in conjunction with the method for testing the internationalized software may be adapted to the data structure of the font used for the test of the internationalized software explained as another aspect of the present invention. Furthermore, the present invention explained as the data structure of the font may also be understood as a recording medium storing the relevant data structure of the font.

According to the present invention, it is possible to conduct an efficient test concerning an output to a user of internationalized software executed in a language environment different from that of an original language, with improved visibility of the test objects and with no need to restart the internationalized software for each test category. Other advantages will be explained in the following description of the embodiments of the present invention.

BRIEF DESCRIPTION OF THE DRAWINGS

FIG. 1A shows an example of an externalized resource file of a test object program, FIG. 1B shows an example of a part of a source code of the test object program, and FIG. 1C shows an example of an output screen of the test object program;

FIG. 2A shows an example of a mock-translated resource file based on a conventional art, and FIG. 2B shows an example of an output screen of the test object program;

FIG. 4A shows an example of an externalized resource file of a test object program, FIG. 4B shows an example of a conversion table according to an embodiment of the present invention, and FIG. 4C shows an example of a test resource file according to the embodiment of the present invention;

FIGS. 5a and 5b show a flowchart illustrating an example of a process flow of the apparatus for creating a test resource file according to an embodiment of the present invention;

FIG. 7A shows an example of a hard-coded character detection font according to an embodiment of the present invention, and FIG. 7B shows an example of a display screen having the processed result of the test object program displayed using the hard-coded character detection font;

FIG. 8A shows an example of a garbled character detection font according to an embodiment of the present invention, and FIG. 8B shows an example of a display screen having the processed result of the test object program displayed using the garbled character detection font;

FIG. 9A shows an example of a reverse font according to an embodiment of the present invention, and FIG. 9B shows an example of a display screen having the processed result of the test object program displayed using the reverse font;

FIG. 10A shows an example of a sort font according to an embodiment of the present invention, and FIG. 10B shows an example of a display screen having the processed result of the test object program displayed using the sort font;

DETAILED DESCRIPTION OF THE INVENTION

Figure 3:
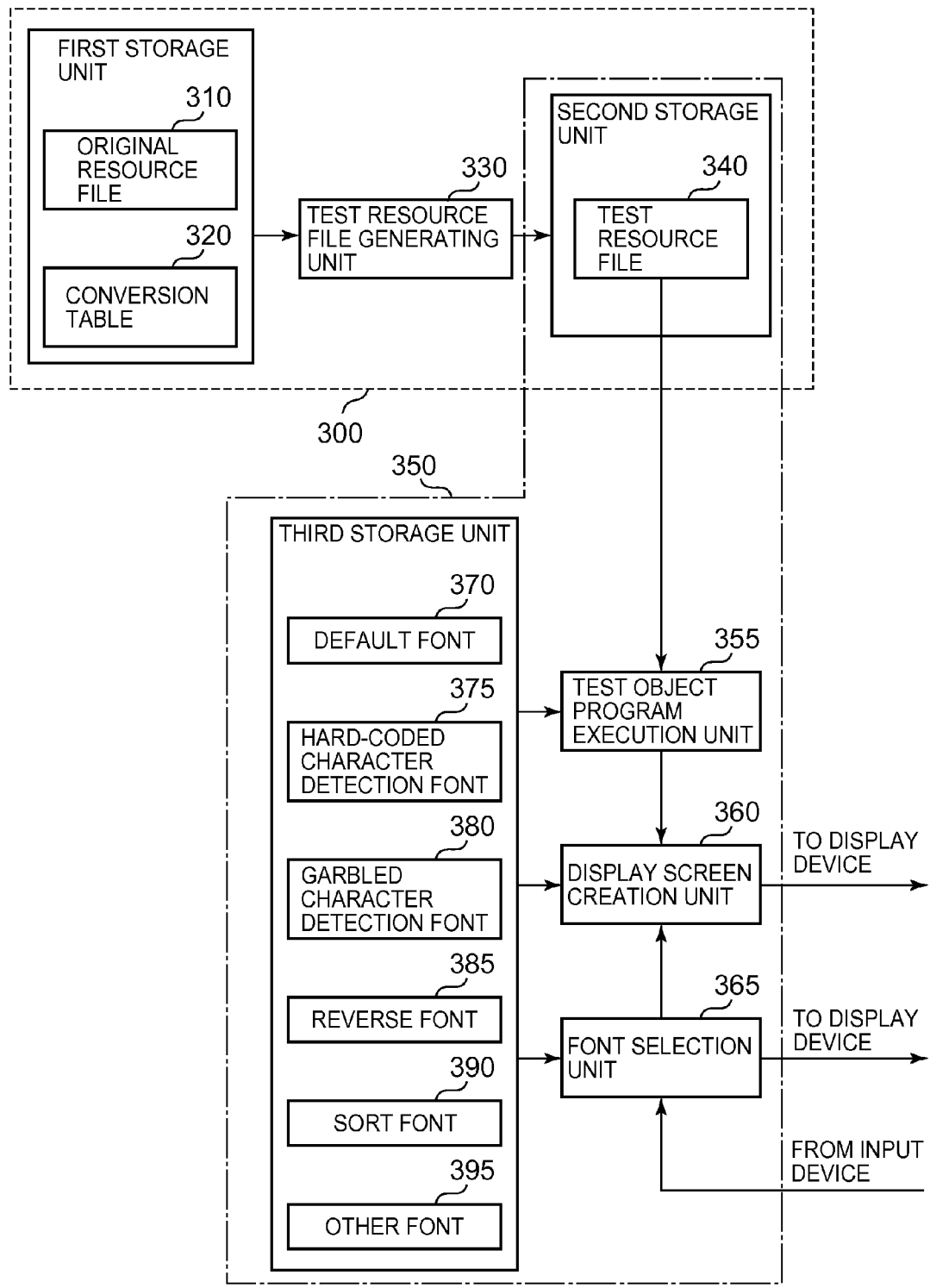
FIG. 3 shows a configuration example of an apparatus for creating a test resource file according to an embodiment of the present invention and an apparatus for testing a test object program according to the embodiment of the present invention.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), a optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java®, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/ or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Prior to the description of the present invention, an externalized resource file of internationalized software, an improved mock translation method and problems thereof will be explained with reference to FIGS. 1A, 1B, 1C, 2A, and 2B. Hereinafter, the internationalized software is referred to as a "program to be tested" or "test object program", and the externalized resource file is simply referred to as a "resource file". FIG. 1A shows, as an example of the resource file, a resource file 100 of a test object program with English as the original language. As shown in the figures, the resource file includes a plurality of items, each consisting of a key and a character string to be assigned to the key. When the test object program encounters a key at the time of execution, it searches the resource file for the relevant key, and reads the value of the character string to be assigned to the key. This operation will now be described in more detail using a source code 105 shown in FIG. 1B and an output screen 110 of the test object program shown in FIG. 1C.

The command "showMessage( )" included in the source code 105 is a command to display on a screen a character string obtained by assigning the second argument to the variable included in the character string of the first argument. Specifically, when executing the "showMessage" command, the test object program retrieves the key "MSG01" as the first argument from the resource file 100, and reads the corresponding character string value "The status is {0}." The test object program then assigns "Green", received as the second argument, to {0} of the read character string value, to eventually display "The status is Green." on the screen, as shown in 115 in FIG. 1C. It is noted that {0} included in the character string assigned to the key MSG01 is an "assignment portion", and the variable assigned to {0} has its value determined at the time of execution.

Now, the improved mock translation method and problems thereof will be explained with reference to FIGS. 2A and 2B. As described above, in the improved mock translations different characters of a translation target language that would likely cause a problem are added before and after the first character of the character string of the original language for each item in the resource file of the original language. Further, marks indicating the "beginning" and the "end" are added before and after the assignment portion included in the resource file. The mock-translated resource file 200 shown in FIG. 2A corresponds to the resource file 100 shown in FIG. 1A that is mock-translated according to the improved technology. Herein, the translation target language is Japanese.

As seen from FIG. 2A, in this example, the characters

"竹"

and

"金"

and the characters

"護"

and

"愛"

are selected and added before and after the first characters of alphabets "T" and "G", respectively, as the characters that would likely cause a problem. For the first characters of the other items, different Japanese characters are selected and added before and after the different alphabets. The first character of each item is put in "( )", facilitating identification of the first character. Further, the characters

"開始"

and

"終了"

are added before and after the assignment portion {0}.

FIG. 2B shows a screen 205 that is displayed when the test object program, read for execution of the mock translation, executes the source code shown in FIG. 1B. Focusing on the character string "Green" displayed in the field 210, the characters

"開始"

and

"終了"

are displayed before and after "Green", with no Japanese characters added before and after the first character "G", and it is thus understood that this character string is a hard-coded, assigned character string. The first characters of the three character strings in the list box 215 each have different Japanese characters added before and after the same, and it is thus understood that it is possible to carry out a validation test of a sort result by executing the Sort command. Furthermore the Japanese characters displayed before and after the first character "R" of the character string "Refresh the Status" displayed on the button 225 are different from the initially added Japanese characters, so that it is understood that there is a problem in display of the characters

"ソ"

and

"十"

in the relevant portion.

However, the testing method utilizing such improved mock translation still has several problems as described above. One problem is that although the assignment portion may be identified, the hard-coded character string may be overlooked. As for the character string having an assignment portion, not only the original character string having a character string assigned thereto, but also the character string in the assignment portion have to be confirmed whether it is a hard-coded character string or not. The confirmation of the hard-coded character string is carried out based on the first character of the character string as described above. This means that, when the assignment portion is in the middle of the character string, as is the case of the character string in the field 210 of FIG. 2B, the confirmation of the hard-coded character string may not be possible for the assignment portion that is not positioned at the beginning of the character string.

Another problem is that, even if it can be confirmed that the list of the character strings is rearranged as a result of sorting, determination as to whether the sorting is proper is difficult. It will be difficult for not only the tester who does not have any knowledge of the translation target language but also the tester who has knowledge thereof to immediately determine whether the sorting has been correctly performed or not for a language having a great number of characters like Japanese. Yet another problem is that in the testing method utilizing the improved mock translation, a large number of types of characters of the translation target language are displayed on the screen, hindering immediate determination as to whether there is any garbled character in the displayed characters. For example, it is not possible to identify the garbled characters by seeing the display screen 205 in FIG. 2B alone.

Furthermore, with the improved testing method, visibility of the test objects on the display screen is low, since a single display screen of the internationalized software that performs processing by referring to a mock-translated, externalized resource file is used to try to confirm the results all at once. On the other hand, if an externalized resource file suitable for the test content is to be prepared for every test category, it will be necessary to restart the internationalized software the number of times corresponding to the number of test categories, hindering efficient testing.

In view of the foregoing, the present invention solves the above-described problems by using a newly developed test resource file and a plurality of fonts prepared for the respective test categories. More specifically, the present invention makes it possible to provide a display screen suitable for the test for each test category, while preparing only one mock-translated resource file for the test, by displaying the output from the test object program that performs processing by referring to the resource file by using a plurality of fonts prepared for the respective test categories. The problems specific to the respective test categories are solved by preparing a plurality of fonts for the respective test categories, and by making the character codes as the test objects distinguishable from the character codes that are not the test objects, while giving some thought to the character shapes to be associated with the character codes.

Firstly, a novel method of mock translating a resource file according to the present invention will be described with reference to FIGS. 3, 4A, 4B, 4C, 5A, and 5B. Subsequently, a method of testing a test object program using the mock-translated resource file and a plurality of fonts prepared for the respective test categories will be described with reference to FIGS. 3, 7A, 7B, 8A, 8B, 9A, 9B, 11A, 10B, 11A, and 11B.

The portion in FIG. 3 delimited by a dotted line is a functional block diagram of an apparatus 300 for creating a test resource file according to an embodiment of the present invention. The apparatus 300 includes: a first storage unit storing an original resource file 310 and a conversion table 320; test resource file generating unit 330; and a second storage unit storing a test resource file 340. It is noted that the first and second storage units may physically be a single storage device. Further, while Unicode is employed as a prescribed character coding scheme in the present embodiment, the present invention is not restricted thereto, and it is of course possible to employ any other character coding scheme. The "character code" as used herein is a code associated with a character, which is called a "code point" in Unicode.

The original resource file 310 is an original resource file referred to by the test object program during execution. FIG. 4A shows, as an example of the original resource file 310, a resource file 400 in which the original language is English. In the present embodiment, the translation target language is Japanese. The conversion table 320 is a table in which the characters of the original language as the first language and the characters of the translation target language as the second language are associated with each other one for one. In order to enable such one-to-one mapping, it is required that the range of the character codes of the characters used in the translation target language is greater than the range of the character codes of the characters used in the original language. For example, English (ASCII code) uses the smallest range of the character codes, so that it is possible to select Japanese, Chinese, Korean or French as the translation target language. In contrast, when French is the original language, although it may be possible to select Japanese or Chinese as the translation target language, it is not possible to select English. Preferably, in the conversion table 320, some of the characters of the original language are associated one for one with the characters of the translation target language that would likely cause a problem in terms of display.

Here, the characters that would likely cause a problem in terms of display will be described with reference to Japanese characters by way of example. Firstly, the Japanese characters

"表",

"噂"

and

"ソ"

each have the character code in which the second byte corresponds to the bit pattern used in the English language environment as a control code for line feed or the like, so that it may not be displayed properly in some type of the character coding scheme being used. Further, several Japanese characters including

"鯵"

may be converted to different characters in some type of the character coding scheme being used. For example, while the character code of

"鯵"

is U+9BF5 in Unicode, this is converted to 0X88B1 in the character coding scheme called "MS932", whereas it is converted to 0XE9CB in the character coding scheme called "CCSID 942". Even the characters other than those that are known to possibly cause a problem may not be displayed property. Accordingly, it is desirable in the conversion table 320 that some of the characters of the original language are associated one for one with the characters of the translation target language that would likely cause a problem, such that the table includes both the normal characters and the characters that would likely cause a problem in terms of display.

FIG. 4B shows, as an example of the conversion table 320, a conversion table 405 in which English characters are associated one for one with Japanese characters. In the conversion table 405, in the two columns on the left are the English characters and the character codes assigned thereto, and in the two columns on the right are the corresponding Japanese characters and the character codes assigned thereto. The conversion table 320 defines the correspondence for the characters used in the original language, except the meta characters that are symbols used when creating a pattern with regular expression. As seen from the conversion table 405, in Unicode, the English characters except the meta characters are assigned with the character codes in the range from U+0020 to U+007E. Here, the English capital letters "S", "T" and "U" are associated with

"表",

"噂"

and

"ソ"

respectively, that would likely cause a problem.

The test resource file generating unit 330 reads the original resource file 310 and the conversion table 320 from the first storage unit, and converts the characters of the first language to the characters of the second language based on the conversion table 320: to thereby generate a test resource file 340 written in the second language from the resource file 310 of the test object program written in the first language. The test resource file 340 thus generated is stored in the second storage unit as the resource file of the test object program. FIG. 4C shows a test resource file 410 that is generated from the original resource file 400 by converting the English characters to the Japanese characters based on the conversion table 405. As seen from the figure, the test resource file 410 does not include any character of the original language of English.

An example of the process flow of the apparatus 300 according to the present embodiment will now be described with reference to the flowchart shown in FIGS. 5A and 5B. FIG. 5A is a flowchart illustrating an outline of the process flow of the apparatus 300 of the present embodiment. The apparatus 300 firstly reads an original resource file 310 from the first storage unit (step 500). The apparatus 300 then converts the characters of the first language to the characters of the second language based on the conversion table 320, to generate a test resource file 340 written in the second language from the original resource file 310 written in the first language of the test object program (step 505). Lastly, the apparatus 300 stores the generated test resource file 340 to the second storage unit (step 510).

Now, the process in the step 505 will be described in detail with reference to FIG. 5B. Firstly, as pre-processing, the apparatus 300 reads the conversion table 320 from the first storage unit and an empty test resource file 340 from the second storage unit. Thereafter, the main process is started, and the test resource file generating unit 330 determines whether the original resource file 310 includes any readable item (step 515). If there is no readable item (step 515: NO), the process is terminated. If it determines that there is a readable item (step 515; YES), the test resource file generating unit 330 reads one item from the original resource file 310 (step 520). The test resource file generating unit 330 extracts a key from the read item and assigns it to a variable Key (step 525), and writes the variable Key to the test resource file 340 (step 530).

Next, The test resource file generating unit 330 extracts a character string value from the read item, and assigns it to a variable Text (step 535), and further reads one character from the variable Text and assigns it to a variable X (step 540). For confirmation of the assignment portion. The test resource file generating unit 330 confirms the value of the variable X, and if it is a numerical character, it confirms whether the values before and after the variable X correspond to "{" and "}", respectively (step 545). If the value of the variable X is not a numerical character indicating the assignment portion (step 545: NO), The test resource file generating unit 330 refers to the conversion table 320 to convert the character of the variable X, and assigns the converted character to a variable Y (step 550). If the value of the variable X is a numerical character indicating the assignment portion (step 545: YES), The test resource file generating unit 330 assigns the value of the variable X as it is to the variable Y (step 555). It is assumed that the conversion table 320 defines such that the characters "{" and "}" become the same characters after the conversion. Thereafter, The test resource file generating unit 330 writes the variable Y to the test resource file 340 (step 560). It then confirms whether the character previously read from the variable Text is the last character (step 565). If it is not the last character (step 565: NO), the process returns to the step 540. If it is the last character (step 565: YES), the process returns to the step 515.

Returning to FIG. 3, the portion in FIG. 3 delimited by a dashed-dotted line shows a functional block diagram of an apparatus 350 for testing a test object program using a mock-translated resource file and a plurality of fonts prepared for respective test categories, according to an embodiment of the present invention. Herein, the apparatus 300 for creating the test resource file and the apparatus 350 for testing the test object program are explained separately for convenience of the explanation. In effect, it is possible to implement the function of the apparatus 350 and the function of the apparatus 300 with a single computer. The apparatus 350 includes: the second storage unit storing the test resource file 340, a test object program execution unit 355, a display screen creation unit 360, a font selection unit 365, and a third storage unit including a plurality of fonts prepared for the respective test categories. The plurality of fonts included in the third storage unit include: a default font 370, a hard-coded character detection font 375, a garbled character detection font 380, a reverse font 385, a sort font 390, and another font 395. It is noted that the second storage unit and the third storage unit may physically be a same storage device.

The test resource file 340 stored in the second storage unit is a resource file written in a translation target language that is the second language, as explained above. The test resource file 340 is stored in the second storage unit as a resource file of the test object program. The test object program execution unit 355 executes the test object program. Upon execution of the test object program, the test object program execution unit 355 firstly reads the test resource file 340 from the second storage unit and, thereafter, refers to the test resource file 340 to execute processing of the test object program and outputs the processed results.

The display screen creation unit 360 receives the processed results from the test object program, and creates a display screen of the processed results using the default font included in the third storage unit. At this time, the display screen creation unit 360 temporarily stores the processed results received from the test object program in a buffer. The created display screen is transmitted to a display device for display. When receiving a designation of a font from the font selection unit 365, the display screen creation unit 360 reads the processed results of the test object program from the buffer, and newly creates a display screen of the processed results using the designated font. The created display screen is again transmitted to the display device for display.

The font selection unit 365, when receiving a selection request of a font to be used from a user via an input device such as a mouse, keyboard and the like, refers to the third storage unit to confirm available fonts, and creates a dialog box for font selection. The font selection unit 365 transmits the created dialog box to the display device. When receiving a designation of the font to be used from the user, the font selection unit 365 notifies the display screen creation unit 360 of the designated font type.

Figure 6:
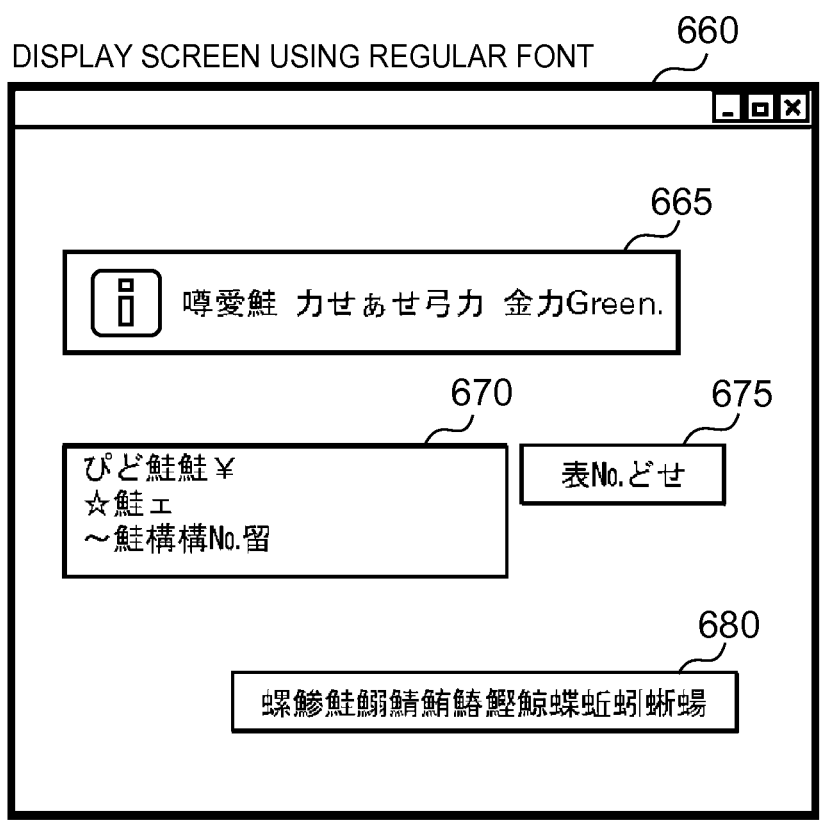
FIG. 6 shows an example of a display screen having the execution result of a test object program displayed using a regular font.

Now, prior to the description of the plurality of fonts prepared for the respective test categories according to the embodiment of the present invention, the processed results of the test object program displayed using a normal or regular font will be described. When the processed results of the test object program that performs processing by referring to the test resource file 410 shown in FIG. 4C are displayed using a regular font, a display screen 660 as shown in FIG. 6 is obtained. It is noted that the display screen 110 shown in FIG. 1C is the display screen of the processed results of the test object program that performs processing by referring to the original resource file 100. As described above, the test resource file 410 does not include any English characters, and thus, it is supposed that no English characters would be displayed on the output display screen. Accordingly, the English character string "Green" displayed in the field 665 in FIG. 6 is a hard-coded character string. In the display screen 660, however, there exist both Japanese characters and English characters, making it hard for the tester to immediately detect the hard-coded character string.

Further, the character string displayed on the button 680 in FIG. 6 differs from the character string of MSG02 in the test resource file 410, which means that it has garbled characters. However, since there are many types of characters displayed on the display screen 660, it is not possible for the tester to determine that the character string displayed on the button 680 includes garbled characters by seeing the display screen 660 alone. Furthermore, the three character strings displayed on the list box 670 in FIG. 6 include various Japanese characters such as hiragana letters, Chinese letters, katakana letters, and symbols, and accordingly, when the tester executes sorting, it is not possible for the tester to immediately determine whether the sort result is correct or not. As described above, when the test resource file according to the embodiment of the present invention is used together with a regular font, it is not possible to provide a screen display suitable for a test for each test category.

Hereinafter, the plurality of fonts prepared for the respective test categories according to the embodiment of the present invention will be explained. Firstly, the hard-coded character detection font 375 used for detection of hard-coded character strings will be explained. In the detection of the hard-coded character strings, a plurality of character codes corresponding to the characters of the original language as the first language correspond to a plurality of character codes as the test objects, or, the objects of detection. Since the test resource file 340 according to the present invention is created by converting all the characters of the original language included in the original resource file 310 to the characters of the translation target language based on the conversion table 320, it can be said that any character of the original language included in the output of the test object program that performs processing by referring to the test resource file 340 should be the character hard-coded in the source code, or one derived from another resource that is not a test object. The character codes corresponding to the characters of the translation target language as the second language included in the conversion table 320, and the character codes not corresponding to either the characters of the original language or the characters of the translation target language included in the conversion table 320, correspond to a plurality of character codes that are not the test objects.

In the hard-coded character detection font 375, all the character codes that are not the test objects are associated with a same character shape in order to improve visibility of the characters of the original language as the test objects on a screen. The same character shape is preferably an inconspicuous character shape such as a hollow square or a blank, a less frequently used character shape, or an inconspicuous and less frequently used character shape. On the other hand, the character codes of the original language as the test objects are associated with the character shapes of the characters of the original language corresponding to the relevant character codes without modification.

FIG. 7A shows, as an example of the hard-coded character detection font 375, a table 700 of the hard-coded character detection font in the case of creating a test resource file using the conversion table 405 shown in FIG. 4B with English as the original language and Japanese as the translation target language. In the leftmost column of the table 700 are the character codes, and in the rightmost column are glyphs in the hard-coded character detection font assigned to the corresponding character codes. It is noted that the "glyph" refers to a character shape assigned to a character code. Glyphs of a regular font are added in the central column of the table 700 for reference. In the table 700, the character codes U+3000 to U+FFEA correspond to the Japanese characters included in the conversion table 405. Since they are the character codes that are not the test objects as explained above, here, they are each assigned with a hollow square character shape. In the table 700, the character codes U+0020 to U+007E correspond to the English characters. They are the character codes as the test objects as explained above, and thus, they are each assigned with the character shape of the original character.

The other character codes in the table 700 correspond to a plurality of other character codes of Unicode. Since they are not the test objects as explained above, they are each assigned with a hollow square character shape, as are the above-described character codes. It should be noted that the number of rows in the table 700 does not indicate the actual number of the character codes. FIG. 7B shows a display screen 705 in the case where the processed results of the test object program that performs processing by referring to the test resource file 410 shown in FIG. 4C are displayed using the table 700 of the hard-coded character detection font. In FIG. 7B, the characters other than the hard-coded character string "Green" shown in the field 710 are al displayed as the hollow square symbols. As such, when the hard-coded character detection font 375 is used, the characters that are not the test objects are all displayed in the same character shape, which allows the tester to readily detect the hard-coded characters without being misled by the characters that are not the objects of detection including those of the translation target language.

The garbled character detection font 380 will now be explained that is used for determination of displayability of the characters specific to the translation target language as the second language. In the determination of displayability, the character codes not corresponding to either the characters of the original language or the characters of the translation target language included in the conversion table 320 correspond to a plurality of character codes as the test objects, or, the objects of detection. Since the test resource file 340 of the present invention is created by converting all the characters of the original language included in the original resource file 310 to the characters of the translation target language based on the conversion table 320, the characters to be included in the output of the test object program that has read the test resource file 340 should be the characters of the translation target language included in the conversion table 320. Nevertheless, the output may include the characters of the original language hard-coded in the source code or derived from another resource other than the test object, as described above in conjunction with the hard-coded character detection font 375. The relevant characters of the original language are not those displayed as a result of garbling. Therefore, if the output includes any character other than the characters of the translation target language included in the conversion table 320 and the characters of the original language, it must be a character that is not supposed to be displayed, i.e. a garbled character.

As such, the character codes corresponding to the characters of the original language and the character codes corresponding to the characters of the translation target language included in the conversion table correspond to a plurality of character codes that are not the test objects. In the garbled character detection font 380, the character codes as the test objects are all associated with a same character shape in order to improve visibility of the garbled characters as the test objects on the screen. The same character shape is preferably a conspicuous character shape such as a postal mark, or a character shape less frequently used and conspicuous. On the other hand, the character codes that are not the test objects are each associated with a same character shape that is different from the character shape associated to the character codes as the test objects. This same character shape is preferably an inconspicuous character shape such as a hollow square or a blank.

FIG. 8A shows, as an example of the garbled character detection font 380, a table 800 of the garbled character detection font in the case of generating a test resource file based on the conversion table 405 shown in FIG. 4B, with English as the original language and Japanese as the translation target language. In the leftmost column of the table 800 are the character codes of the garbled character detection font 380, and in the rightmost column are glyphs assigned to the corresponding character codes. Further, in the central column are glyphs in a regular font added for reference. In the table 800 the character codes U+3000 to U+FFEA are those corresponding to the Japanese characters included in the conversion table 405. As explained above, they are the character codes that are not the test objects, and thus, a hollow square character shape is assigned to each of them.

In the table 800, the character codes U+0020 to U+007E are those corresponding to the English characters. They also are the character codes that are not the test objects as described above, and thus, a hollow square character shape is assigned to each of them. The other character codes in the table 800 are a plurality of other character codes in Unicode. Since they are the character codes as the test objects as explained above, the character shape of postal mark is assigned to each of them in this example. It should be noted that the number of rows in the table 800 does not indicate the actual number of character codes.

FIG. 8B shows a display screen 810 in the case where the processed results of the test object program that performs processing by referring to the test resource file 410 shown in FIG. 4C are displayed using the table 800 of the garbled character detection font 380. In FIG. 8B, the postal marks are displayed on the button 830, making it possible to immediately understand that garbled characters are displayed thereon. As such, when using the garbled character detection font 380, the garbled characters are displayed in a prescribed character shape, thereby allowing the tester to readily detect the garbled characters even if the translation target language has a great number of types of characters. Moreover, the characters that are not the test objects, such as those displayed in the list box 820, are displayed in the same, inconspicuous character shape, so that the tester can readily detect the garbled characters, without being misled by the characters other than the objects of detection, such as the characters of the translation target language, which are displayed correctly.

The reverse font 385 will now be explained that is used for confirmation of the character strings included in the resource file written in the first language. In the confirmation of the original character strings, the character codes corresponding to the characters of the original language and the character codes corresponding to the characters of the translation target language included in the conversion table 320 correspond to a plurality of character codes as the test objects, or, the objects of confirmation. Since the test resource file 340 of the present invention is created by converting all the characters of the original language included in the original resource file 310 to the characters of the translation target language based on the conversion table 320, it is not possible to obtain information regarding the original character strings from the output screen of the test object program that performs processing by referring to the test resource file 340. Thus, in order to obtain the information regarding the original character strings, the character codes corresponding to the characters of the original language and the character codes corresponding to the characters of the translation target language included in the conversion table 320 are used. The character codes not corresponding to either the characters of the original language or the characters of the translation target language included in the conversion table 320 correspond to a plurality of character codes that are not the test objects.

For the purpose of obtaining the information regarding the original character strings, the character codes corresponding to the characters of the translation target language included in the conversion table 320 are each associated with the character shape of the character of the original language that has the character of the translation target language corresponding to the relevant character code as the "converted-to" character upon generation of the test resource file 340. In this manner, it can be configured such that the character strings included in the original resource file 310 are each displayed in the original language on the output screen of the test object program that performs processing by referring to the test resource file 340 of the present invention. Further, the character codes corresponding to the characters of the original language are each assigned with the character shape of the character corresponding to the relevant character code. This ensures that the perfect information regarding the original character strings can be obtained even in the presence of hard-coded character string(s). Meanwhile, the character codes that are not the test objects are each associated with a same character shape to facilitate identification. It can be said that they are the character codes of the garbled characters, as explained above in conjunction with the garbled character detection font 380. That is, in the display screen using the reverse font, it is not only possible to obtain the information regarding the original character strings, but also possible to detect the garbled characters. In this regard, the same character shape is preferably a conspicuous character shape such as a postal mark, or a conspicuous and less frequently used character shape.

FIG. 9A shows, as an example of the reverse font 385, a table 850 of the reverse font in the case of generating a test resource file 340 based on the conversion table 405 shown in FIG. 4B, with English as the original language and Japanese as the translation target language. In the table 850, to facilitate understanding, the character codes of the characters of the original, English language and the corresponding characters are added in the leftmost two columns. Accordingly, the central column of the table 850 shows the character codes of the reverse font 385 and the rightmost column shows glyphs assigned to the corresponding character codes. The column therebetween shows glyphs in a regular font. In the table 850, the character codes U+3000 to U+FFEA are those corresponding to the Japanese characters included in the conversion table 405. As explained above, they are the character codes as the test objects, so that they are assigned with the character shapes of the original English characters before conversion.

Referring to the portion 855 in FIG. 9A delimited by a dotted line, the character code U+8868 is assigned with the character shape of

"表",

"噂"

in the regular font, In the reverse font 385, the character code U+8868 is assigned with the character shape of "S", which is the character corresponding to the character code U+0053 of English that has the character code U+8868 as the "converted-to" code. In the table 850, the character codes U+0020 to U+007E are those corresponding to the English characters. They are the character codes corresponding to the characters of the original language as explained above, and thus, the character shapes of the characters of the original language are assigned thereto without modification. The other character codes in the table 850 correspond to a plurality of other character codes in Unicode. They correspond to the garbled characters as explained above, so that the character shape of the postal mark is assigned thereto in this example. It should be noted that the number of rows in the table 850 does not indicate the actual number of the character codes.

FIG. 9B shows a display screen 860 in the case where the processed results of the test object program that read the test resource file 410 shown in FIG. 4C at the time of activation are displayed using the table 850 of the reverse font. As seen in FIG. 9B, the character strings are displayed in the original, English language except for the portion of the button 880 having the garbled characters, and the screen is approximately the same as the original display screen 110 shown in FIG. 1C. As such, when using the reverse font 385, the tester can readily detect the garbled characters while he/she can confirm the original character strings without the need to open the original resource file.

The sort font 390 will now be explained that is used for determination of validity of the sort result of the character strings according to the order of the characters defined in the translation target language as the second language. In the determination of validity of the sort result, the character codes corresponding to the characters of the translation target language included in the conversion table 320 correspond to a plurality of character codes as the test objects. Since the test resource file 340 of the present invention is created by converting all the characters of the original language included in the original resource file 310 to the characters of the translation target language based on the conversion table 320, the output of the test object program that read the test resource file 340 must include the characters of the translation target language included in the conversion table 320. Accordingly, the character codes corresponding to the characters of the original language as the first language, as well as the character codes not corresponding to either the characters of the original language or the characters of the translation target language included in the conversion table 320, correspond to a plurality of character codes that are not the test objects.

In the sort font 390, in order to facilitate determination on the screen as to whether the character strings of the translation target language are sorted correctly according to the order of the characters defined in the translation target language, the character codes as the test objects are each associated with a character shape that indicates the order defined for the character corresponding to the relevant character code. Meanwhile, the character codes that are not the test objects are each associated with a same character shape, which is preferably a less frequently used character shape, an inconspicuous character shape, or a less frequently used and inconspicuous character shape, such as a hollow square or a blank.

FIG. 10A shows, as an example of the sort font 390, a table 900 of the sort font in the case of creating a test resource file 340 using the conversion table 405 shown in FIG. 4B with English as the original language and Japanese as the translation target language. In the leftmost column of the table 900 are the character codes, and in the rightmost column are glyphs in the sort font assigned to the corresponding character codes. In the central column of the table 900, glyphs in a regular font are added for reference. In the table 900, the character codes U+3000 to U+FFEA are those corresponding to the Japanese characters included in the conversion table 405. They are the character codes as the test objects as explained above and thus, they are each assigned with the character shape indicating the order defined for the relevant character. It is noted that the "order of the characters defined in the translation target language" may be any order; how to define the order of the characters depends on which kind of test is to be conducted. Herein, the order of the character codes of the Japanese characters included in the conversion table 405 is employed. For the character codes such as the character code U+FFEA to which symbols are assigned in the glyphs of the regular font, an inconspicuous character shape such as a hollow square may be assigned instead of the number like (93).

In the table 900, the character codes U+0020 to U+007E are those corresponding to the English characters. The other character codes in the table 900 correspond to a plurality of other character codes in Unicode. Since they are the character codes that are not the test objects as described above, they are each assigned with a hollow square character shape in this example. It should be noted that the number of rows in the table 900 does not indicate the actual number of the character codes. FIG. 10B shows a display screen 905 in the case where the processed results of the test object program that performs processing by referring to the test resource file 410 shown in FIG. 4C are displayed using the table 900 of the sort font. Referring to FIG. 10B, the characters of the character strings to be listed on a list box 915 are all displayed as the numbers. Thus, determination as to whether a sort result when executing the sort command by clicking on the button 920 (see the button 125 in FIG. 1C) is correct or not can readily be made by checking the numbers corresponding to the first characters of the respective character strings (if they are the same number, the numbers of the following characters; this applies hereinafter as well). As such, when using the sort font 390, it is readily possible to determine whether the sorting is correct or not even if the translation target language has a great number of types of characters.

The four fonts described above, i.e., the hard-coded character detection font 375, the garbled character detection font 380, the reverse font 385, and the sort font 390, can be created for example in the following manner. The existing font file is copied and given a new name. The newly created font file is opened using a commercially available font editor or the like, and the character shapes to be assigned to the character codes are edited as appropriate to create any of the above-described fonts of the present invention. It is of course possible to create the font of the present invention from the beginning by using a font editor. As for the character coding scheme designated when creating a font according to the present invention, any character coding scheme may be selected as long as it includes the character set of the original language and the character set of the translation target language.

Figure 11A:
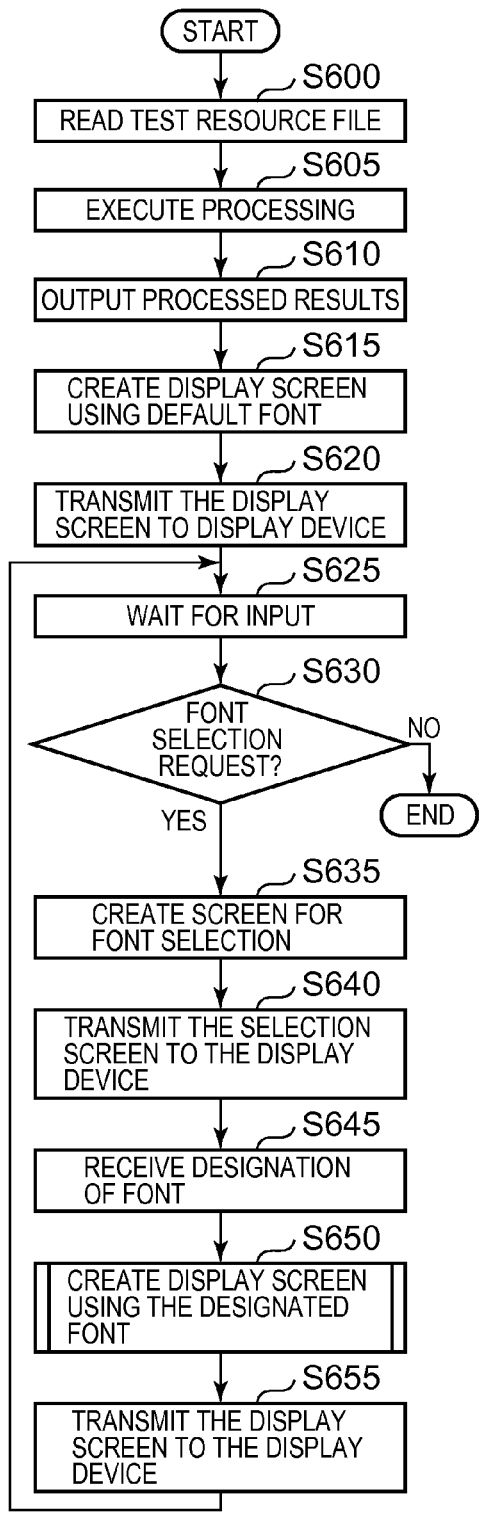
FIG. 11A shows a flowchart illustrating an example of a process flow of the apparatus for testing a test object program according to an embodiment of the present invention.

Hereinafter, an example of a process flow for testing a test object program by using a mock-translated resource file and a plurality of fonts prepared for respective test categories according to an embodiment of the present invention will be explained with reference to the flowchart shown in FIG. 11A. Firstly, as pre-processing, a test resource file 340 is stored in the second storage unit, and a plurality of fonts prepared for the respective test categories are stored in the third storage unit together with a regular font, in such a manner that they can be referred to by the test object program execution unit 355, the display screen creation unit 360 and the font selection unit 365. In order for the fonts to be actually used, it is necessary to install the fonts into a computer that uses the fonts. The installing method will be explained later in conjunction with an implementation example. As the processing starts, firstly, the test object program execution unit 355 reads the test resource file 340 from the second storage unit (step 600). The test object program execution unit 355 performs various processing of the test object program by referring to the test resource file 340 (step 605), and outputs the processed results (step 610).

The display screen creation unit 360 receives the processed results from the test object program, and creates a display screen of the processed results by using a default font included in the third storage unit (step 615). At this time, the display screen creation unit 360 temporarily stores the processed results received from the test object program in a buffer. The display screen creation unit 360 transmits the created display screen to a display device (step 620). The font selection unit 365 waits for an input from the user (step 625), and upon reception of the input, it determines whether the received input corresponds to a font selection request (step 630). If it is not the font selection request (step 630: NO), the process is terminated here. If it is the font selection request (step 630: YES), the font selection unit 365 confirms available fonts by referring to the third storage unit, and creates a display screen for font selection (step 635). The font selection unit 365 then transmits the created display screen for font selection to the display device to be displayed on the screen (step 640).

When the font selection unit 365 receives a designation of the font to be used from the user (step 645), it provides the display screen creation unit 360 with information regarding the type of the designated font. The display screen creation unit 360 reads the processed results of the test object program from the buffer, and newly creates a display screen of the processed results using the font selected by the user (step 650). The display screen creation unit 360 again transmits the created display screen to the display device (step 655). The process then returns to the step 625.

Figure 11B:
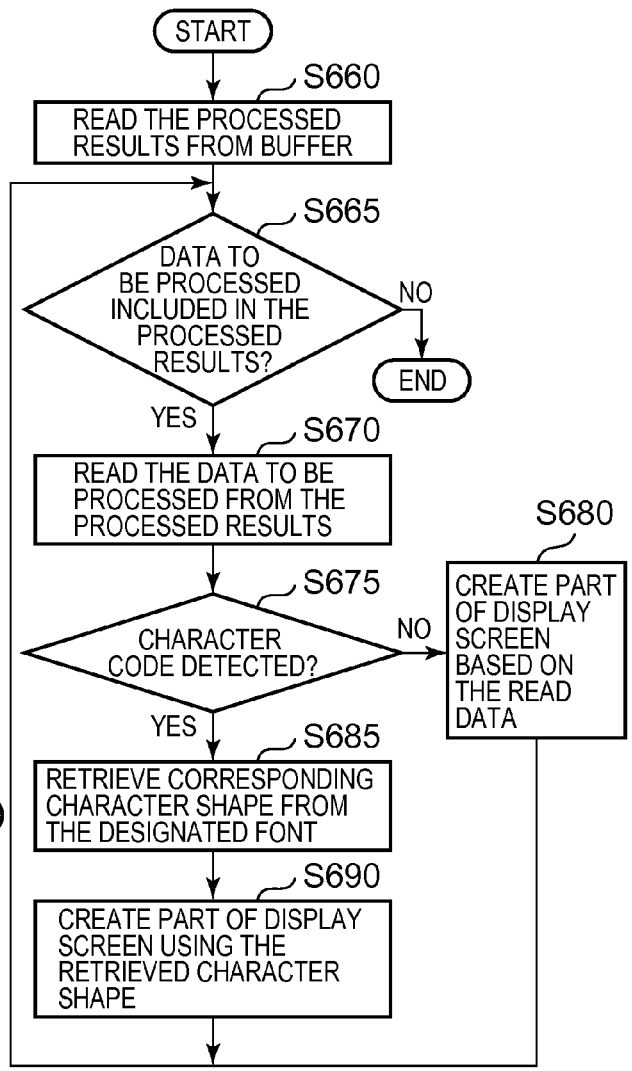
FIG. 11B shows a flowchart illustrating an example of a process flow for creating a display screen of the processed result using a designated font.

Now, referring to FIG. 11B, the process in the step 650 will be explained in detail. Firstly, the display screen creation unit 360 reads the processed results of the test object program from the buffer (step 660). The display screen creation unit 360 determines whether the read processed results include data to be processed next (step 665). If there is no data to be processed next (step 665: NO), the process is terminated here.

If there is any data to be processed next (step 665: YES), the display screen creation unit 360 reads the data to be processed next from the processed results (step 670), and determines whether the data includes any character code (step 675). If it includes no character code (step 675: NO), the display screen creation unit 360 creates a part of the display screen based on the data to be processed without modification (step 680). If it is determined in the step 675 that at least one character code is included, the display screen creation unit 360 retrieves the character shape assigned to the relevant character code from the font designated by the user (step 685), and uses the retrieved character shape to create a part of the display screen based on the data to be processed (step 690).

Each font according to the present invention includes a plurality of first character codes that are to be the test objects, a plurality of items of first character shape information associated one for one with the first character codes according to a first rule, a plurality of second character codes that are the other character codes of a prescribed character coding scheme, and a plurality of items of second character shape information associated one for one with the second character codes according to a second rule. Accordingly, in the case where any font of the present invention is designated in the step 645 shown in FIG. 11A, if the character code included in the data to be processed is the first character code that is the test object, then the display screen creation unit 360 retrieves from the font the first character shape information assigned to the relevant first character code according to the first rule, and uses the information for screen display. If the character code included in the data to be processed is the second character code that is not the test object, the display screen creation unit 360 retrieves from the font the second character shape information assigned to the second character code according to the second rule, and uses the information for screen display. Accordingly, on the display screen, the first character code as the test object and the second character code that is not the test object are displayed in a distinguishable manner. After the step 680 or the step 690, the process returns to the step 665.

Figure 12:
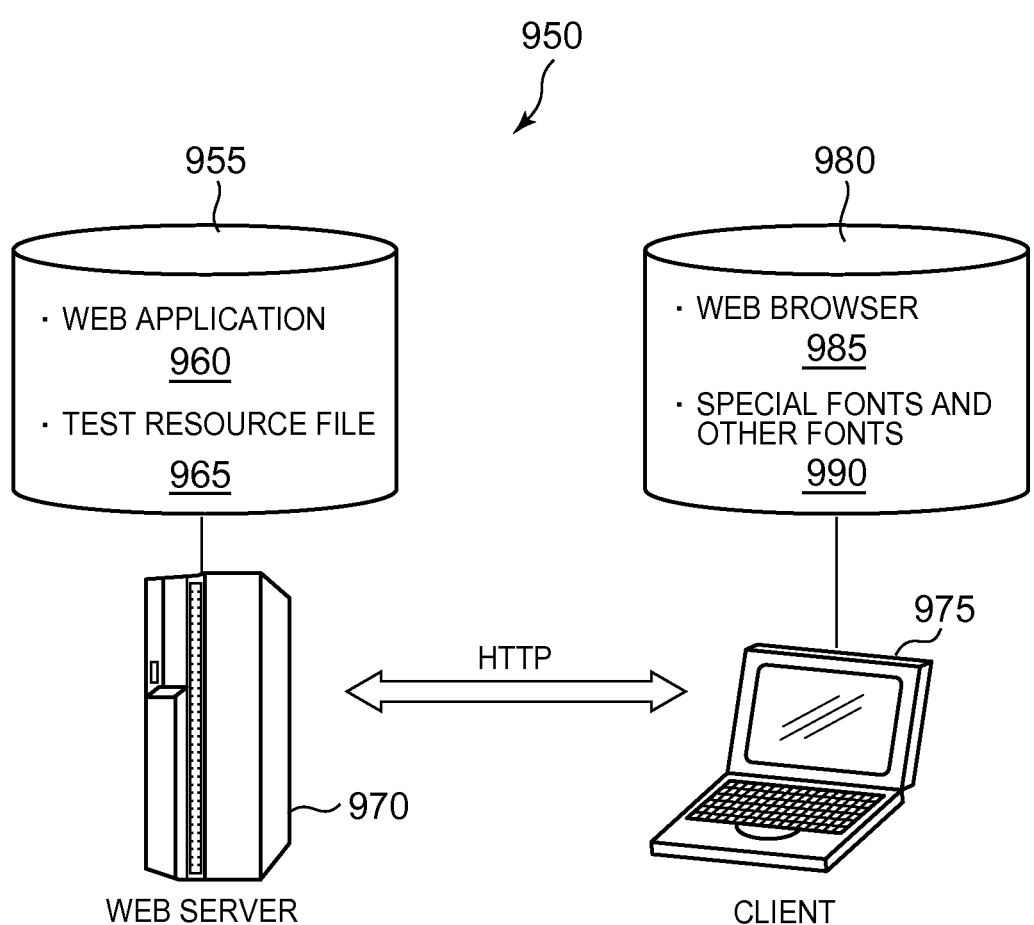
FIG. 12 shows an implementation example of an overall system according to an embodiment of the present invention.
Figure 13:
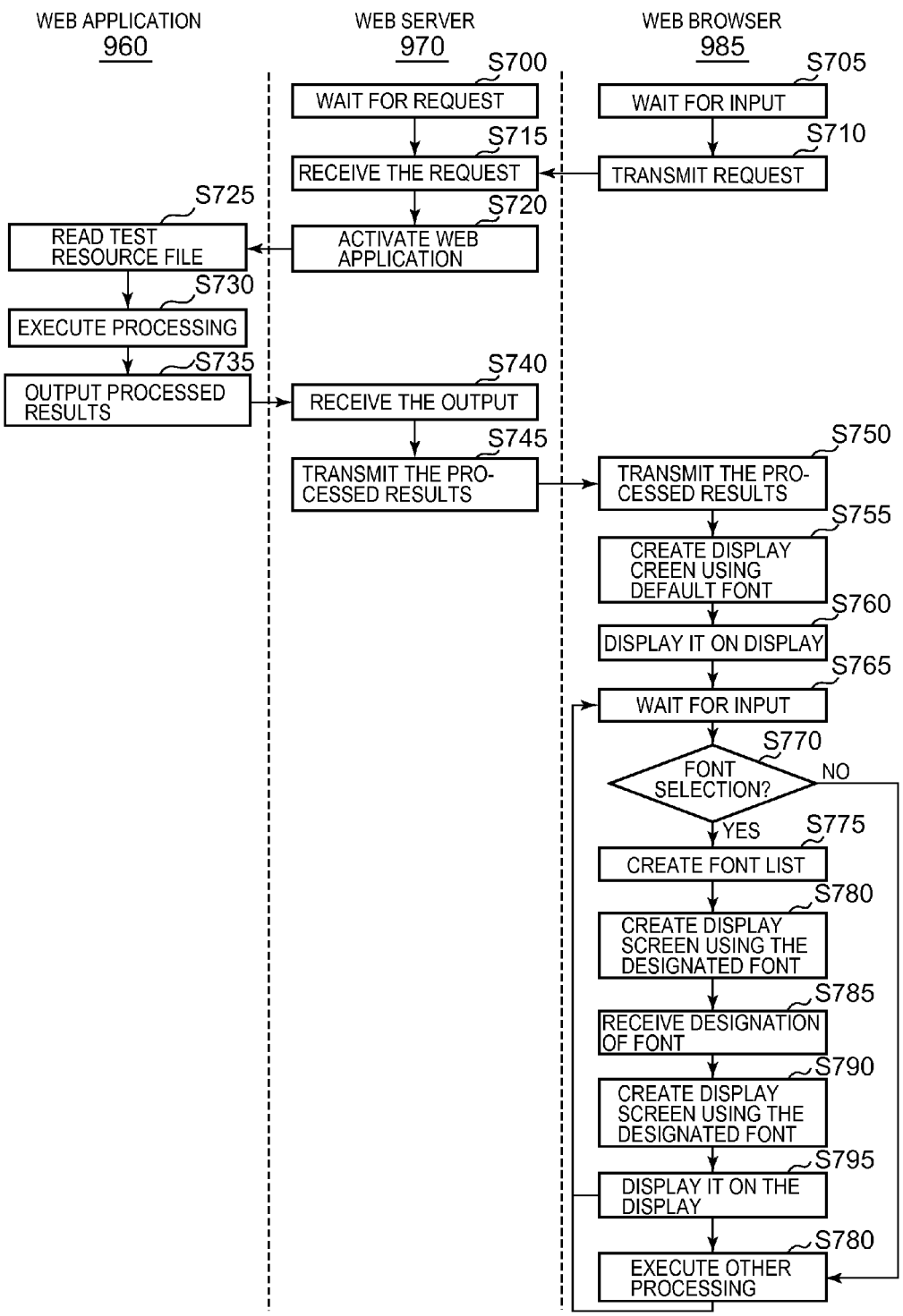
FIG. 13 shows a flowchart illustrating an example of a process flow of the entire system shown in FIG. 12.
Figure 14:
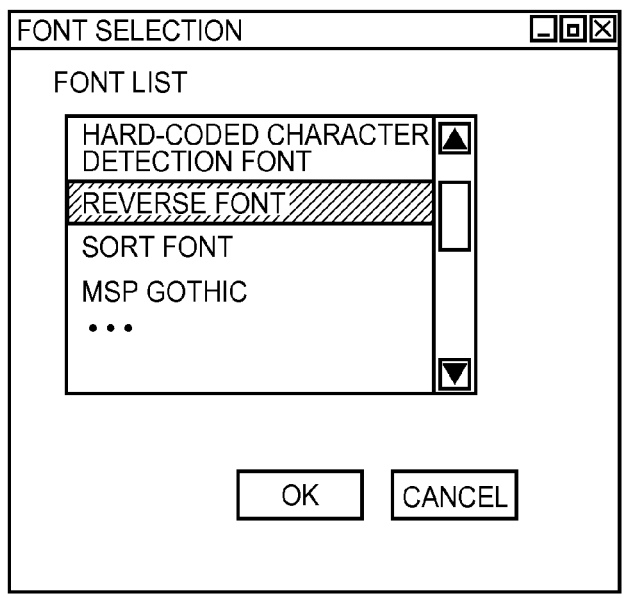
FIG. 14 shows an example of a dialog box displayed for selection of a font to be used.

Hereinafter, an implementation example of the present invention will be described with reference to FIGS. 12-14. FIG. 12 shows an implementation example of a system 950 implementing the present invention. The system 950 includes a Web server 970, a storage device 955 connected to the Web server 970, a client 975 connected to the Web server 970 via a network, and a storage device 980 connected to the client 975. The storage device 955 includes a Web application 960 as a test object program, and a test resource file 965. The storage device 980 includes a Web browser 985 and a plurality of fonts 990 prepared for the respective test categories.

The Web server 970, when receiving a processing request from the client 975 via the network, activates the Web application 960 that executes the processing. Further, when receiving processed results from the Web application 960, the Web server 970 transmits the processed results to the client 975 who requested the processing via the network. The Web application 960 as the test object program is loaded to a RAM of the Web server 970 from the storage device 955, and executed by a central processing unit (CPU) of the Web server 970, to thereby function as the test object program execution unit 355 shown in FIG. 3. The Web application 960 reads the test resource file 965 from the storage device 955 at the time of activation, to execute the requested processing by referring to the relevant test resource file 965. The processed results outputted from the Web application 960 are passed to the Web server 970.

The client 975 activates the Web browser 985 in response to a request from a tester who tests the Web application 960. The Web browser 985 is loaded from the storage device 980 to a RAM of the client 975, and executed by a CPU of the client 975, to function as the display screen creation unit 360 and the font selection unit 365 shown in FIG. 3. The Web browser 985, in response to an input of the tester, requests the processing provided by the Web application 960 from the Web server 970. When receiving the processed results from the Web server 970, the Web browser 985 serving as the display screen creation unit 360 creates a display screen of the processed results using a default font, and displays it on a display of the client 975.

When receiving a font selection request from the tester, the Web browser 985 serving as the font selection unit 365 acquires a list of available fonts by referring to the fonts stored in the storage device 980 or by calling a function for acquiring available font names, and displays a dialog box for font selection on the display of the client 975. When receiving a designation of the font to be used from the tester, the Web browser 985 uses the designated font to display again the processed results on the display of the client 975.

In order to allow the Web browser 985 to refer to the plurality of fonts 990 prepared for the respective test categories according to the present invention, it is necessary to install the fonts 990 into the client 975. Such installation is carried out by an operating system (OS) running on the client 975. For example, when using Microsoft Windows® XP as the OS, the fonts are installed using the Fonts in the Control Panel functioning to add, modify and manage the fonts of the computer. There is "Install new font" prepared in the file menu of the Fonts. When using Microsoft Windows® versions before XP, the font management software called Adobe Type Manager (ATM) can be used. Once the ATM is installed into the computer, all that is needed is to drag and drop the font file into the system folder and restart the computer.

A process flow of the system 950 will now be explained with reference to the flowchart in FIG. 13. The Web server 970 waits for a request from the client in the step 700. The Web browser 985 as the client waits for an input from the tester (step 705). When receiving the request for the processing provided by the Web application 960, the Web browser 985 transmits the request to the Web server 970 (step 710). In response to reception of the request (step 715), the Web server 970 activates the Web application 960 (step 720). Upon activation, the Web application 960 reads the test resource file according to the present invention (step 725), and refers to the test resource file to execute the requested processing (step 730). The Web application 960 outputs processed results and passes them to the Web server 970 (step 735).

In response to reception of the processed results (step 740), the Web server 970 transmits the processed results to the Web browser 985 (step 745). When receiving the processed results (step 750), the Web browser 985 creates a display screen of the processed results using a default font (step 755), and displays the same on the display of the client 975 (step 760). The Web browser 985 waits for an input from the tester (step 765). Upon reception of the input from the tester, the Web browser 985 determines whether the input corresponds to a font selection request (step 770). If it is the font selection request (step 770; YES), the Web browser 985 refers to the storage device 980 to check the available fonts, and creates a list of available fonts including the plurality of fonts prepared for the respective test categories according to the present invention (step 775).

The Web browser 985 uses the created list to display a dialog box for font selection on the display of the client 975 (step 780) (see FIG. 14), and waits for a designation of the font from the tester. In response to an input of the font designation from the tester (step 785), the Web browser 985 uses the designated font to display the processed results again (steps 790, 795). In the case of NO in the step 770, i.e., if the input from the tester is not the font selection request, the process proceeds to the step 800, where the Web browser 985 executes other processing. After the step 795 or the step 800, the process returns to the step 765, where the Web browser 985 again waits for an input from the tester. While the processes in the steps 765 through 795 are repeated, when the fonts are switched by the tester among those prepared for the respective test categories according to the present invention, the corresponding display screens as shown in FIGS. 7B, 8B, 9B and 10B are displayed on the display of the client in turn.

Figure 15:
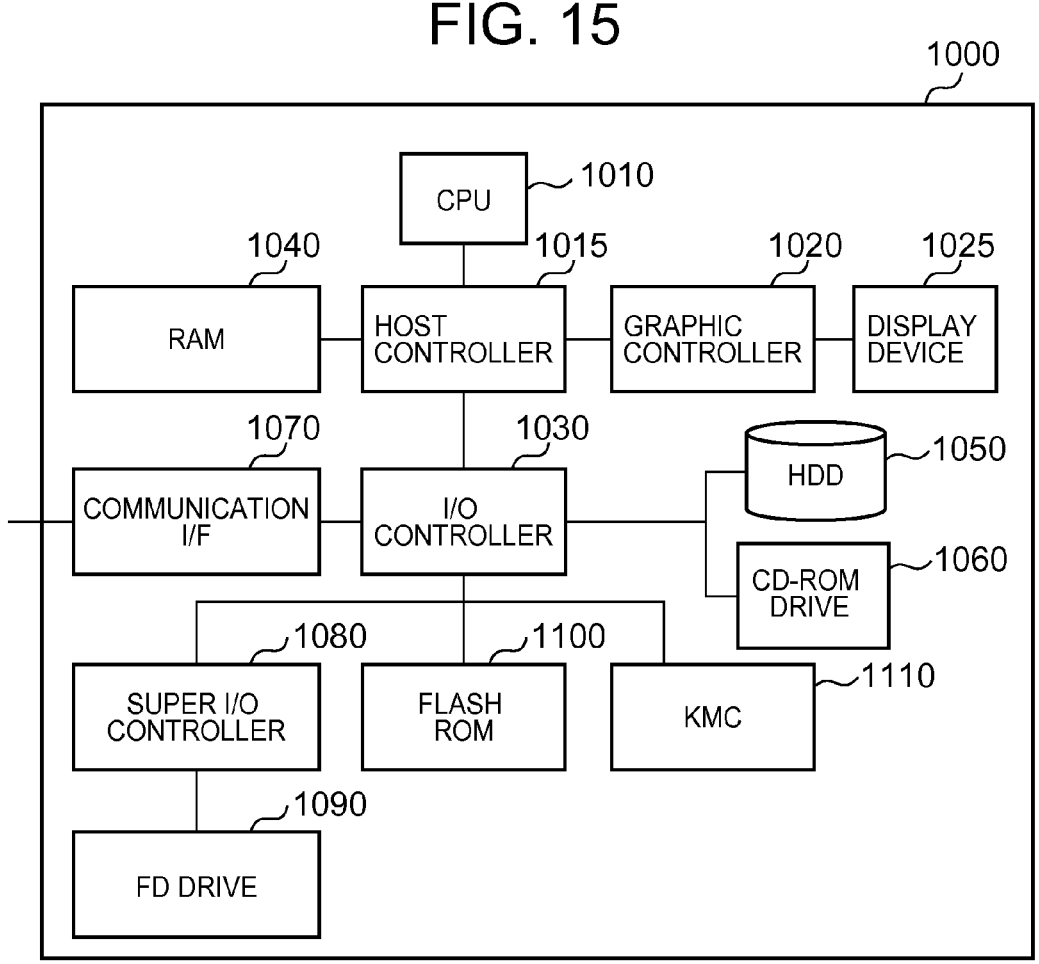
FIG. 15 shows an example of a hardware configuration of the apparatus for creating a test resource file according to an embodiment of the present invention and the apparatus for testing a test object program according to an embodiment of the present invention.

FIG. 15 shows an example of a hardware configuration of the apparatus 300 for creating a test resource file according to the present invention. FIG. 15 also shows an example of a hardware configuration of the apparatus 350 for testing a test object program using a mock-translated resource file and a plurality of fonts prepared for the respective test categories, according to the present invention. FIG. 15 may also be regarded as an example of a hardware configuration of a computer when implementing the function of the apparatus 300 and the function of the apparatus 350 in a single computer. In the system 950 explained referring to FIGS. 12-14, the apparatus 350 is configured with two computers, i.e., the Web server 970 and the client 975. In such a case, the hardware configuration shown in FIG. 15 may be regarded as an example of the hardware configuration of each of the Web server 970 and the client 975.

A system 1000 includes: a CPU peripheral portion that includes a CPU 1010 and a RAM 1040 connected to each other by a host controller 1015, a graphic controller 1020, and a display device 1025; an input/output portion that includes a communication interface 1070, a hard disk drive 1050 and a CD-ROM drive 1060 that are connected to the host controller 1015 by an input/output controller 1030; and a legacy input/output portion that includes a super I/O controller 1080 connected to the input/output controller 1030, a flexible disk drive 1090 connected to the super I/O controller 1080, a flash ROM 1100, and a keyboard mouse controller 1110.

The host controller 1015 connects the CPU 1010 with the RAM 1040, the CPU 1010 accessing the RAM 1040 at a high transfer rate. The CPU 1010 operates based on a program stored in a hard disk to control the portions. The program for testing the test object program according to the present invention is stored in a recording medium such as an optical recording medium like a flexible disk, CD-ROM, DVD or PD, a magneto-optical recording medium like an MD, or a semiconductor memory like an IC card, and provided to a user. Alternatively, the program for testing the test object program may be downloaded from an external computer via the network. Similarly, the plurality of fonts prepared for the respective test categories according to the present invention are stored in the recording medium such as the optical recording medium like a flexible disk, CD-ROM, DVD or PD, the magneto-optical recording medium like an MD, or the semiconductor memory like an IC card, or alternatively downloaded via the network, and provided to the user.

The input/output controller 1030 connects the host controller 1015 with the communication interface 1070, the hard disk drive 1050 and the CD-ROM drive 1060, which are relatively high-speed input/output devices. The communication interface 1070 communicates with another computer via the network. The CD-ROM drive 1060 reads a program or data from a CD-ROM, and provides the same to the CPU 1010 via the input/output controller 1030. The input/output controller 1030 is connected with a flash ROM 1100 and with the relatively low-speed input/output devices such as the flexible disk drive 1090 and the keyboard mouse controller 1110. The flash ROM 1100 stores a boot program executed by the CPU 1010 upon activation of the device system 1000, a program dependent on hardware and others. The flexible disk drive 1090 reads a program or data from a flexible disk, and provides the same to the super I/O controller 1080 via the RAM 1040. The super I/O controller 1080 connects the flexible disk and various input/output devices via parallel port, serial port, keyboard port, mouse port and the like.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a". "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically clamed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. An apparatus for testing an internationalized software that performs processing by referring to an externalized resource file, comprising:
   a processor;
   a memory;
   a first storage unit configured to store the externalized resource file written in a first language and a conversion table having characters of the first language and characters of a second language associated one for one with each other by creating a mapping between the characters of the first language and the characters of the second language such that a range of character codes corresponding to the characters of the second language is greater than a range of character codes corresponding to the characters of the first language;
   a test resource file generating unit configured to generate a test resource file written in the second language from the externalized resource file by converting the characters of the first language to the characters of the second language by referring to the conversion table;
   a second storage unit configured to store the generated test resource file;
   a test object program execution unit configured to execute the internationalized software; and
   a display screen creation unit configured to create a display screen in which output information outputted from the internationalized software that performs processing by referring to the generated test resource file as the externalized resource file is displayed using one of a plurality of fonts prepared for respective test categories of the internationalized software;
   wherein character codes included in the output information are classified into three groups of character codes: a first group of character codes corresponding to the characters of the first language, which are not supposed to be included in the output information; a second group of character codes corresponding to the characters of the second language included in the conversion table, which are supposed to be included in the output information; and a third group of character codes not corresponding to either the characters of the first language or the characters of the second language included in the conversion table, which are not supposed to be included in the output information, and
   wherein each of the plurality of fonts uses different association rules when associating character shapes to a group of character codes selected as test objects and a group of other character codes in a prescribed character coding scheme, such that the group of character codes as the test objects and the group of other character codes in the prescribed character coding scheme are visually distinguishable from each other in a display of the output information using a relevant font.

2. The apparatus according to claim 1, wherein the test resource file generating unit is further configured to generate the test resource file from the externalized resource file by converting at least one character of the first language to at least one character of the second language, and wherein the at least one character of the second language comprises a bit pattern corresponding to an undisplayed character code of the first language.

3. The apparatus according to claim 1, wherein the test resource file generating unit is further configured to facilitate determination of validity of a sort result of character strings according to an order of characters defined in the second language, wherein a plurality of first character codes are a plurality of character codes corresponding to the characters of the second language included in the conversion table, wherein the first rule causes each of the plurality of first character codes to be associated with a character shape indicating an order defined for a character of the second language corresponding to a relevant first character code, and wherein the second rule causes each of a plurality of second character codes to be associated with a same character shape.

4. The apparatus according to claim 1, wherein the test resource file generating unit is further configured to facilitate determination of displayability of characters specific to the second language, wherein a plurality of first character codes are a plurality of character codes not corresponding to either the characters of the first language or the characters of the second language included in the conversion table, and wherein the first rule causes each of the plurality of first character codes to be associated with a same character shape.

5. The apparatus according to claim 1, wherein the test resource file generating unit is further configured to facilitate confirmation of character strings included in the externalized resource file written in the first language, wherein a plurality of first character codes are a plurality of character codes corresponding to the characters of the second language included in the conversion table, and wherein the first rule causes each of the plurality of first character codes to be associated with a character shape of a character of the first language that has a character of the second language corresponding to a relevant first character code as a converted-to character upon generation of the test resource file.

6. A computer program product embodied in a non-transitory computer readable storage medium for testing an internationalized software that performs processing by referring to an externalized resource file, when executed by a computer, causes the computer to execute the steps of:
  reading data from the externalized resource file written in a first language;
  generating a test resource file written in a second language from the externalized resource file written in the first language by converting characters of the first language included in the data to characters of the second language by referring to a conversion table having the characters of the first language and the characters of the second language associated one for one with each other by creating a mapping between the characters of the first language and the characters of the second language such that a range of character codes corresponding to the characters of the second language is greater than a range of character codes corresponding to the characters of the first language; and
  displaying output information outputted from the internationalized software that performs processing by referring to the generated test resource file as the externalized resource file on a screen by using one of a plurality of fonts prepared for respective test categories of the internationalized software;
  wherein character codes included in the output information are classified into three groups of character codes: a first group of character codes corresponding to the first language, which are not supposed to be included in the output information; a second group of character codes corresponding to the second language included in the conversion table, which are supposed to be included in the output information; and a third group of character codes not corresponding to either the first language or the second language included in the conversion table, which are not supposed to be included in the output information, and
  wherein each of the plurality of fonts uses different association rules when associating character shapes to a group of character codes that are test objects in a test of the internationalized software and a group of other character codes in a prescribed character coding scheme, such that the group of character codes that are the test objects and the group of other character codes in the prescribed character coding scheme are visually distinguishable from each other in a display of the output information using a relevant font.

7. The computer program product according to claim 6, wherein the processing, when executed by the computer, further causes the computer to generate the test resource file from the externalized resource file by converting at least one character of the first language to at least one character of the second language, and wherein the at least one character of the second language comprises a bit pattern corresponding to an undisplayed character code of the first language.

8. The computer program product according to claim 6, wherein the processing, when executed by the computer, further causes the computer to:
  use the conversion table for determination of validity of a sort result of character strings according to an order of characters defined in the second language, wherein a plurality of first character codes are a plurality of character codes corresponding to the characters of the second language included in the conversion table, wherein the first rule causes each of the plurality of first character codes to be associated with a character shape indicating an order defined for a character of the second language corresponding to a relevant first character code, and wherein the second rule causes each of a plurality of second character codes to be associated with a same character shape;
  use the conversion table for determination of displayability of characters specific to the second language, wherein the plurality of first character codes are the plurality of character codes not corresponding to either the characters of the first language or the characters of the second language included in the conversion table, and wherein the first rule causes each of the plurality of first character codes to be associated with a same character shape; and/or
  use the conversion table for confirmation of character strings included in the externalized resource file written in the first language, wherein the plurality of first character codes are the plurality of character codes corresponding to the characters of the second language included in the conversion table, and wherein the first rule causes each of the plurality of first character codes to be associated with a character shape of a character of the first language that has a character of the second language corresponding to the relevant first character code as a converted-to character upon generation of the test resource file.

9. A computer program product comprising:
  a non-transitory computer readable storage medium to manage a data structure of a font employing a prescribed character coding scheme used in a test of an internationalized software that refers to a test resource file, wherein the non-transitory computer readable storage medium stores instructions to generate the test resource file by converting characters of a first language included in an externalized resource file to characters of a second language based on a conversion table, the conversion table comprising:
  a plurality of first character codes corresponding to a first language that are test objects in the test of the internationalized software;
  a plurality of first character shape information associated one for one with the plurality of first character codes according to a first rule;
  a plurality of second character codes in the prescribed character coding scheme; and
  a plurality of second character shape information associated one for one with the plurality of second character codes according to a second rule;

wherein the plurality of first character codes corresponding to the characters of the first language correspond to the plurality of second character codes corresponding to the characters of the second language included in the conversion table such that the plurality of second character codes corresponding to the characters of the second language is greater than the plurality of first character codes corresponding to the characters of the first language, and wherein when a relevant first character code of the plurality of first character codes is detected from an output of the internationalized software that performs processing by referring to the test resource file, a first character shape information corresponding to the relevant first character code is used for screen display, and when a relevant second character code of the plurality of second character codes is detected from the output of the internationalized software that performs processing by referring to the test resource file, a second character shape information corresponding to the relevant second character code is used for screen display.

10. The computer program product according to claim 9, wherein the non-transitory computer readable storage medium comprises further instructions to facilitate detection of a hard-coded character string of the plurality of first character codes corresponding to the characters of the first language, wherein the first rule causes each of the plurality of first character codes to be associated with a character shape of a character of the first language corresponding to the relevant first character code without modification, and wherein the second rule causes each of the plurality of second character codes to be associated with a same character shape.

11. The computer program product according to claim 9, wherein the non-transitory computer readable storage medium comprises further instructions to facilitate determination of validity of a sort result of character strings according to an order of characters defined in the second language, wherein the plurality of first character codes are a plurality of character codes corresponding to the characters of the second language included in the conversion table, wherein the first rule causes each of the plurality of first character codes to be associated with a character shape indicating an order defined for a character of the second language corresponding to the relevant first character code, and wherein the second rule causes each of the plurality of second character codes to be associated with a same character shape.

12. The computer program product according to claim 9, wherein the non-transitory computer readable storage medium comprises further instructions to facilitate determination of displayability of characters specific to the second language, wherein the plurality of first character codes are a plurality of character codes not corresponding to either the characters of the first language or the characters of the second language included in the conversion table, and wherein the first rule causes each of the plurality of first character codes to be associated with a same character shape.

13. The computer program product according to claim 9, wherein the non-transitory computer readable storage medium comprises further instructions to facilitate confirmation of character strings included in the externalized resource file written in the first language, wherein the plurality of first character codes are a plurality of character codes corresponding to the characters of the second language included in the conversion table, and wherein the first rule causes each of the plurality of first character codes to be associated with a character shape of a character of the first language that has a character of the second language corresponding to the relevant first character code as a converted-to character upon generation of the test resource file.

14. The computer program product according to claim 9, wherein the non-transitory computer readable storage medium comprises further instructions to generate the test resource file by causing a plurality of the characters of the first language to be associated one for one with a plurality of the characters of the second language that would likely cause a problem in terms of display.

15. The computer program product according to claim 9, wherein the non-transitory computer readable storage medium comprises further instructions to generate the test resource file by causing a character of the first language to be associated one for one with a character of the second language, and wherein the character of the second language comprises a bit pattern corresponding to an undisplayed character code of the first language.

16. A non-transitory computer readable storage medium containing computer code for controlling a computer to test an internationalized software that performs processing by referring to an externalized resource file, the non-transitory computer readable storage medium containing:

computer code configured to read data from the externalized resource file written in a first language;

computer code configured to generate a test resource file written in a second language from the externalized resource file written in the first language by converting characters of the first language included in the data to characters of the second language by referring to a conversion table having the characters of the first language and the characters of the second language associated one for one with each other by creating a mapping between the characters of the first language and the characters of the second language such that a range of character codes corresponding to the characters of the second language is greater than a range of character codes corresponding to the characters of the first language; and computer code configured to display output information outputted from the internationalized software that performs processing by referring to the test resource file as the externalized resource file on a screen by using one of a plurality of fonts prepared for respective test categories of the internationalized software;

wherein character codes included in the output information are classified into three groups of character codes: a first group of a plurality of character codes corresponding to the characters of the first language, which are not supposed to be included in the output information; a second group of a plurality of character codes corresponding to the characters of the second language included in the conversion table, which are supposed to be included in the output information, and a third group of a plurality of character codes not corresponding to either the characters of the first language or the characters of the second language included in the conversion table, which are not supposed to be included in the output information, and wherein each of the plurality of fonts uses different association rules when associating character shapes to a group of a plurality of character codes that are test objects in a test of the internationalized software and a group of other character codes in a prescribed character coding scheme, such that the group of the plurality of character codes that are the test objects and the group of other character codes in the prescribed character coding scheme are distinguishable from each other in a display of the output information using a relevant font.

17. The non-transitory computer readable storage medium according to claim 16, wherein the non-transitory computer readable storage medium further comprises computer code configured to generate the test resource file from the externalized resource file by converting at least one character of the first language to at least one character of the second language, and wherein the at least one character of the second language comprises a bit pattern corresponding to an undisplayed character code of the first language.

18. The non-transitory computer readable storage medium according to claim 16, wherein the non-transitory computer readable storage medium further comprises computer code configured to facilitate determination of validity of a sort result of character strings according to an order of characters defined in the second language, wherein a plurality of first character codes are a plurality of character codes corresponding to the characters of the second language included in the conversion table, wherein the first rule causes each of the plurality of first character codes to be associated with a character shape indicating an order defined for a character of the second language corresponding to a relevant first character code, and wherein the second rule causes each of a plurality of second character codes to be associated with a same character shape.

19. The non-transitory computer readable storage medium according to claim 16, wherein the non-transitory computer readable storage medium further comprises computer code configured to facilitate determination of displayability of characters specific to the second language, wherein a plurality of first character codes are a plurality of character codes not corresponding to either the characters of the first language or the characters of the second language included in the conversion table, and wherein the first rule causes each of the plurality of first character codes to be associated with a same character shape.

20. The non-transitory computer readable storage medium according to claim 16, wherein the non-transitory computer readable storage medium further comprises computer code configured to facilitate confirmation of character strings included in the externalized resource file written in the first language, wherein a plurality of first character codes are a plurality of character codes corresponding to the characters of the second language included in the conversion table, and wherein the first rule causes each of the plurality of first character codes to be associated with a character shape of a character of the first language that has a character of the second language corresponding to a relevant first character code as a converted-to character upon generation of the test resource file.

\* \* \* \* \*